United States Patent
Quan et al.

(10) Patent No.: US 10,349,426 B2
(45) Date of Patent: Jul. 9, 2019

(54) WIRELESS NETWORK SCHEDULING METHOD, ACCESS DEVICE, AND WIRELESS NETWORK

(71) Applicant: Huawei Technologies Co., Ltd., Shenzhen (CN)

(72) Inventors: Wei Quan, Beijing (CN); Jian Zhang, Beijing (CN); Bingzhao Li, Beijing (CN); Zhenxing Hu, Shenzhen (CN); Xiaodong Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 149 days.

(21) Appl. No.: 15/473,178

(22) Filed: Mar. 29, 2017

(65) Prior Publication Data

US 2017/0208607 A1 Jul. 20, 2017

Related U.S. Application Data

(63) Continuation of application No. PCT/CN2014/087803, filed on Sep. 29, 2014.

(51) Int. Cl.
H04W 72/04 (2009.01)
H04W 72/12 (2009.01)
H04L 1/18 (2006.01)
H04W 72/14 (2009.01)

(52) U.S. Cl.
CPC ........... H04W 72/12 (2013.01); H04L 1/1861 (2013.01); H04W 72/14 (2013.01)

(58) Field of Classification Search
None
See application file for complete search history.

(56) References Cited

U.S. PATENT DOCUMENTS

| 2011/0070884 | A1* | 3/2011 | Choi ..................... H04B 7/024 455/434 |
| 2013/0201966 | A1* | 8/2013 | Weng ................... H04W 72/04 370/336 |
| 2014/0169284 | A1 | 6/2014 | Cai et al. |
| 2014/0269632 | A1* | 9/2014 | Blankenship ......... H04W 76/15 370/329 |
| 2014/0321275 | A1* | 10/2014 | Anand .................. H04L 47/125 370/232 |
| 2015/0358067 | A1* | 12/2015 | Zhang ............... H04W 52/0216 370/315 |

FOREIGN PATENT DOCUMENTS

| CN | 101877890 A | 11/2010 |
| CN | 102056264 A | 5/2011 |
| CN | 102480756 A | 5/2012 |
| CN | 102638295 A | 8/2012 |
| WO | 2010005951 A2 | 1/2010 |
| WO | WO 2013173801 A1 | 11/2013 |

* cited by examiner

Primary Examiner — Ayanah S George
(74) Attorney, Agent, or Firm — Leydig, Voit & Mayer, Ltd.

(57) ABSTRACT

A wireless network scheduling method, an access device, and a wireless network are provided. Implementation of the method includes: determining, by a second access device, a serving cell subset to which a terminal belongs; and sending, by the second access device, downlink data and downlink scheduling information to the first access device corresponding to the serving cell in the serving cell subset, where the downlink scheduling information is used to instruct the first access device to send the downlink data to the terminal.

18 Claims, 13 Drawing Sheets

US 10,349,426 B2

WIRELESS NETWORK SCHEDULING METHOD, ACCESS DEVICE, AND WIRELESS NETWORK

CROSS-REFERENCE TO RELATED APPLICATIONS

This application is a continuation of International Application No. PCT/CN2014/087803, filed on Sep. 29, 2014, the disclosure of which is hereby incorporated by reference in its entirety.

TECHNICAL FIELD

The present invention relates to the field of communications technologies, and in particular, to a wireless network scheduling method, an access device, and a wireless network.

BACKGROUND

In a Long Term Evolution (LTE) system and a Long Term Evolution Advanced (LTE-Advanced) system, there are increasingly more forms of various deployed networks, such as a heterogeneous network (Hetnet), coordinated multipoint transmission/reception (Coordinated Multiple Points, CoMP), small cell networking (such as a pico cell), dense small cell networking, and dual connectivity.

A wireless network completes coverage by using a cell. Currently, there are more types of cells. Generally, according to a coverage area, a macro cell has a relatively large coverage area, and a small cell, a pico cell, or the like has a relatively small coverage area. The small cell is usually deployed in an urban hotspot, such as a mall or a supermarket, or another indoor or outdoor place in which coverage and a capacity need to be improved. An access device provides physical device support for cell coverage, and a base station generally provides a macro cell.

An objective pursued in a wireless network is to improve a capacity and coverage of a wireless network system and optimize transmission in the entire wireless network system.

Currently, a manner of deploying a small cell is implemented through a remote optical fiber. In the solution, a connection between a small cell and a macro cell is established by using an optical fiber. In this way, the small cell and the macro cell feature rapid communication. However, because optical fiber deployment is limited by a place, construction, and the like, the solution is not quite applicable to deployment of dense cells, and downlink data transmission performance is relatively low.

SUMMARY

Embodiments of the present invention provide a wireless network scheduling method, an access device, and a wireless network, so as to implement flexible wireless deployment or wired deployment of a macro cell, a small cell, and a pico cell, and obtain relatively good data transmission performance.

A first aspect of the embodiments of the present invention provides a wireless network scheduling method, including:

determining, by a second access device, a serving cell subset to which a terminal belongs, where the terminal is a destination terminal to which the second access device sends downlink data, the serving cell subset is a set of serving cells that can be accessed by the terminal, and each serving cell is corresponding to a first access device; and sending, by the second access device, downlink data and downlink scheduling information to the first access device corresponding to the serving cell in the serving cell subset, where the downlink scheduling information is used to instruct the first access device to send the downlink data to the terminal.

With reference to an implementation manner of the first aspect, in a first possible implementation manner, the sending downlink data and downlink scheduling information includes:

sending the downlink data and the downlink scheduling information by using an interface between the first access device and the second access device; or sending the downlink data and the downlink scheduling information to a third access device, and instructing the third access device to forward the downlink data and the downlink scheduling information to the first access device corresponding to the serving cell in the serving cell sub set.

With reference to an implementation manner of the first aspect, in a second possible implementation manner, after the sending downlink data and downlink scheduling information, the method further includes:

receiving, by the second access device, first feedback information sent by the first access device corresponding to the serving cell in the serving cell subset; and determining, according to the first feedback information, whether the terminal successfully or unsuccessfully receives the downlink data.

With reference to the second possible implementation manner of the first aspect, in a third possible implementation manner, the determining, according to the first feedback information, whether the terminal successfully or unsuccessfully receives the downlink data includes:

if the received first feedback information indicates that first access devices of a specified quantity or a specified proportion successfully receive the downlink data, determining that the terminal successfully receives the downlink data; or if the first feedback information indicates that a quantity or a proportion of first access devices that successfully receive the downlink data is less than a specified quantity or a specified proportion, confirming that the terminal unsuccessfully receives the downlink data.

With reference to the second possible implementation manner of the first aspect, in a fourth possible implementation manner, if it is determined that the terminal unsuccessfully receives the downlink data, the method further includes:

if the second access device has a control function of a radio link control layer and that of an upper layer, instructing, by the second access device, the radio link control layer to perform an operation of retransmitting an automatic repeat request.

With reference to the first, the second, the third, or the fourth possible implementation manner of the first aspect, in a fifth possible implementation manner, after the determining, by the second access device, a serving cell subset to which the terminal belongs, the method further includes:

sending, by the second access device, uplink scheduling information to the first access device corresponding to the serving cell in the serving cell subset, where the uplink scheduling information is used to instruct to grant the terminal permission to send uplink data on a resource specified by the uplink scheduling information; and receiving, by the second access device, uplink data forwarded by the first access device corresponding to the serving cell in the serving cell subset.

With reference to the fifth possible implementation manner of the first aspect, in a sixth possible implementation manner, uplink data forwarded by each first access device includes:

uplink data that is obtained after each first access device decodes the uplink data and that is forwarded after the first access device confirms that the uplink data is successfully received, or uplink data that is forwarded when each first receiving device does not confirm that the uplink data is successfully received; and if the uplink data forwarded by each first access device is the uplink data that is forwarded when each first receiving device does not confirm that the uplink data is successfully received, the method further includes:

combining and decoding, by the second access device, the uplink data forwarded by the first access devices.

With reference to the fifth possible implementation manner of the first aspect, in a seventh possible implementation manner, the sending, by the second access device, uplink scheduling information to the first access device corresponding to the serving cell in the serving cell subset includes:

after determining the serving cell subset to which the terminal belongs, if no scheduling request and/or no buffer report of the terminal device are/is received, sending, by the second access device, the uplink scheduling information to the first access device corresponding to the serving cell in the serving cell subset.

With reference to the seventh possible implementation manner of the first aspect, in an eighth possible implementation manner, after the determining, by the second access device, a serving cell subset to which the terminal belongs, the method further includes:

sending, by the second access device, first configuration information to the first access device corresponding to the serving cell in the serving cell subset, where the first configuration information is used to configure the first access device and/or the terminal to skip sending uplink data without a valid data packet when there is no uplink data, or to send only an uplink grant acknowledgment message when there is no uplink data, and the uplink grant acknowledgment message is used to indicate that there is no uplink data.

With reference to the eighth possible implementation manner of the first aspect, in a ninth possible implementation manner, before the sending, by the second access device, first configuration information to the first access device corresponding to the serving cell in the serving cell subset, the method further includes:

receiving, by the second access device, capability information of the terminal that is forwarded by the first access device corresponding to the serving cell in the serving cell subset; and if the second access device confirms, according to an instruction of the capability information, that the terminal supports skipping sending the uplink data without a valid data packet when there is no uplink data, sending the first configuration information to the first access device corresponding to the serving cell in the serving cell subset; or if the second access device confirms, according to an instruction of the capability information, that the terminal supports sending only the uplink grant acknowledgment message when there is no uplink data, sending the first configuration information to the first access device corresponding to the serving cell in the serving cell subset.

With reference to the fifth possible implementation manner of the first aspect, in a tenth possible implementation manner, before the sending, by the second access device, uplink scheduling information to the first access device corresponding to the serving cell in the serving cell subset, the method further includes:

sending, by the second access device, second configuration information to the first access device corresponding to the serving cell in the serving cell subset, and instructing the first access device corresponding to the serving cell in the serving cell subset to forward the second configuration information to the terminal, where the second configuration information is used to instruct to determine, when the uplink scheduling information occupies at least two control channel elements (CCEs), a CCE that should be used for a feedback resource and a location of the used CCE, and the feedback resource is a feedback resource that is used by the terminal to send second feedback information to the first access device and/or the second access device.

With reference to the tenth possible implementation manner of the first aspect, in an eleventh possible implementation manner, the method further includes:

receiving, by the second access device, second feedback information that is uniformly encoded and respectively and repeatedly sent by the terminal device by using at least two feedback resources.

With reference to the first, the second, the third, or the fourth possible implementation manner of the first aspect, in a twelfth possible implementation manner, the determining, by the second access device, a serving cell subset to which the terminal belongs includes:

determining, by the second access device, a serving cell set, where the serving cell set is a set of serving cells that are managed by the second access device;

broadcasting, by the second access device, a measurement instruction message to a first access device corresponding to a serving cell in the serving cell set, so that the first access device corresponding to the serving cell in the serving cell set forwards the measurement instruction message to the terminal, where the measurement instruction message is used to instruct the terminal to measure a downlink pilot, or is used to instruct any terminal to measure a downlink pilot; and determining, according to measurement result information forwarded by each first access device, a set of serving cells that can be accessed by the terminal as the serving cell subset to which the terminal belongs.

With reference to the twelfth possible implementation manner of the first aspect, in a thirteenth possible implementation manner, the measurement result information includes:

at least one of all downlink pilot measurement results, a downlink pilot measurement result that meets a configuration condition, or information about a correspondence between a terminal identity and a serving cell that can be accessed, where the measurement results are received by the first access device corresponding to the serving cell in the serving cell set.

With reference to the twelfth possible implementation manner of the first aspect, in a fourteenth possible implementation manner, the broadcasting, by the second access device, a measurement instruction message to a first access device corresponding to a serving cell in the serving cell set includes:

repeatedly performing, by the second access device according to a preset rule, broadcasting the measurement instruction message to the first access device corresponding to the serving cell in the serving cell set.

With reference to a possible implementation manner of the first aspect, in a fifteenth possible implementation manner, the method further includes:

determining, by the second access device, a serving cell set, where the serving cell set is a set of serving cells that are managed by the second access device;

determining an idle serving cell in the serving cell set, where the idle serving cell does not belong to any serving cell subset;

instructing a first access device corresponding to the idle serving cell to enter a sleep state; and if it is detected that a terminal enters the idle serving cell, activating the first access device corresponding to the idle serving cell.

A second aspect of the embodiments of the present invention provides an access device, which is used as a second access device, including:

a subset determining unit, configured to determine a serving cell subset to which a terminal belongs, where the terminal is a destination terminal to which the second access device sends downlink data, the serving cell subset is a set of serving cells that can be accessed by the terminal, and each serving cell is corresponding to a first access device; and a sending unit, configured to send downlink data and downlink scheduling information to the first access device corresponding to the serving cell in the serving cell subset determined by the subset determining unit, where the downlink scheduling information is used to instruct the first access device to send the downlink data to the terminal.

With reference to an implementation manner of the second aspect, in a first possible implementation manner, the sending unit is specifically configured to: send the downlink data and the downlink scheduling information by using an interface between the first access device and the second access device; or send the downlink data and the downlink scheduling information to a third access device, and instruct the third access device to forward the downlink data and the downlink scheduling information to the first access device corresponding to the serving cell in the serving cell subset.

With reference to an implementation manner of the second aspect, in a second possible implementation manner, the access device further includes:

a first feedback receiving unit, configured to: after the downlink data and the downlink scheduling information are sent, receive first feedback information sent by the first access device corresponding to the serving cell in the serving cell subset; and a result determining unit, configured to determine, according to the first feedback information received by the first feedback receiving unit, whether the terminal successfully or unsuccessfully receives the downlink data.

With reference to the second possible implementation manner of the second aspect, in a third possible implementation manner, the result determining unit is configured to: if the first feedback information received by the first feedback receiving unit indicates that first access devices of a specified quantity or a specified proportion successfully receive the downlink data, determine that the terminal successfully receives the downlink data; or if the first feedback information indicates that a quantity or a proportion of first access devices that successfully receive the downlink data is less than a specified quantity or a specified proportion, confirm that the terminal unsuccessfully receives the downlink data.

With reference to the second possible implementation manner of the second aspect, in a fourth possible implementation manner, the access device further includes:

a retransmission control unit, configured to: if the result determining unit determines that the terminal unsuccessfully receives the downlink data, and the second access device has a control function of a radio link control layer and that of an upper layer, instruct the radio link control layer to perform an operation of retransmitting an automatic repeat request.

With reference to the first, the second, the third, or the fourth possible implementation manner of the second aspect, in a fifth possible implementation manner, the sending unit is further configured to: after the subset determining unit determines the serving cell subset to which the terminal belongs, send uplink scheduling information to the first access device corresponding to the serving cell in the serving cell subset, where the uplink scheduling information is used to instruct to grant the terminal permission to send uplink data on a resource specified by the uplink scheduling information; and the access device further includes:

a data receiving unit, configured to receive uplink data forwarded by the first access device corresponding to the serving cell in the serving cell subset.

With reference to the fifth possible implementation manner of the second aspect, in a sixth possible implementation manner, uplink data forwarded by each first access device includes: uplink data that is obtained after each first access device decodes the uplink data and that is forwarded after the first access device confirms that the uplink data is successfully received, or uplink data that is forwarded when each first receiving device does not confirm that the uplink data is successfully received; and if the uplink data forwarded by each first access device is the uplink data that is forwarded when each first receiving device does not confirm that the uplink data is successfully received, the access device further includes:

a decoding unit, configured to combine and decode the uplink data that is forwarded by the first access devices and received by the data receiving unit.

With reference to the fifth possible implementation manner of the second aspect, in a seventh possible implementation manner, the sending unit is configured to: after the subset determining unit determines the serving cell subset to which the terminal belongs, if no scheduling request and/or no buffer report of the terminal device are/is received, send the uplink scheduling information to the first access device corresponding to the serving cell in the serving cell subset.

With reference to the seventh possible implementation manner of the second aspect, in an eighth possible implementation manner, the sending unit is further configured to: after the subset determining unit determines the serving cell subset to which the terminal belongs, send first configuration information to the first access device corresponding to the serving cell in the serving cell subset, where the first configuration information is used to configure the first access device and/or the terminal to skip sending uplink data without a valid data packet when there is no uplink data, or to send only an uplink grant acknowledgment message when there is no uplink data, and the uplink grant acknowledgment message is used to indicate that there is no uplink data.

With reference to the eighth possible implementation manner of the second aspect, in a ninth possible implementation manner, the access device further includes:

a capability information receiving unit, configured to receive, by the second access device before the sending unit sends the first configuration information to the first access device corresponding to the serving cell in the serving cell subset, capability information of the terminal that is forwarded by the first access device corresponding to the serving cell in the serving cell subset; and the sending unit is configured to: if confirming, according to an instruction of the capability information, that the terminal supports skipping sending the uplink data without a valid data packet when there is no uplink data, send the first configuration information to the first access device corresponding to the serving cell in the serving cell subset; or if confirming, according to an instruction of the capability information, that the terminal supports sending only the uplink grant acknowledgment message when there is no uplink data, send the first configuration information to the first access device corresponding to the serving cell in the serving cell subset.

With reference to the fifth possible implementation manner of the second aspect, in a tenth possible implementation manner, the sending unit is further configured to: before sending the uplink scheduling information to the first access device corresponding to the serving cell in the serving cell subset, send second configuration information to the first access device corresponding to the serving cell in the serving cell subset, and instruct the first access device corresponding to the serving cell in the serving cell subset to forward the second configuration information to the terminal, where the second configuration information is used to instruct to determine, when the uplink scheduling information occupies at least two control channel elements CCEs, a CCE that should be used for a feedback resource and a location of the used CCE, and the feedback resource is a feedback resource that is used by the terminal to send second feedback information to the first access device and/or the second access device.

With reference to the tenth possible implementation manner of the second aspect, in an eleventh possible implementation manner, the access device further includes:

a second feedback receiving unit, configured to receive second feedback information that is uniformly encoded and respectively and repeatedly sent by the terminal device by using at least two feedback resources.

With reference to the first, the second, the third, or the fourth possible implementation manner of the second aspect, in a twelfth possible implementation manner, the subset determining unit includes:

a set determining unit, configured to determine a serving cell set, where the serving cell set is a set of serving cells that are managed by the second access device;

a broadcast unit, configured to broadcast a measurement instruction message to a first access device corresponding to a serving cell in the serving cell set, so that the first access device corresponding to the serving cell in the serving cell set forwards the measurement instruction message to the terminal, where the measurement instruction message is used to instruct the terminal to measure a downlink pilot, or is used to instruct any terminal to measure a downlink pilot; and a subset determining unit, configured to determine, according to measurement result information forwarded by each first access device, a set of serving cells that can be accessed by the terminal as the serving cell subset to which the terminal belongs.

With reference to the twelfth possible implementation manner of the second aspect, in a thirteenth possible implementation manner, the measurement result information includes:

at least one of all downlink pilot measurement results, a downlink pilot measurement result that meets a configuration condition, or information about a correspondence between a terminal identity and a serving cell that can be accessed, where the measurement results are received by the first access device corresponding to the serving cell in the serving cell set.

With reference to the twelfth possible implementation manner of the second aspect, in a fourteenth possible implementation manner, the broadcast unit is configured to repeatedly perform, according to a preset rule, broadcasting the measurement instruction message to the first access device corresponding to the serving cell in the serving cell set.

With reference to a possible implementation manner of the second aspect, in a fifteenth possible implementation manner, the access device further includes:

a set determining unit, configured to determine a serving cell set, where the serving cell set is a set of serving cells that are managed by the second access device;

an idle cell determining unit, configured to determine an idle serving cell in the serving cell set determined by the set determining unit, where the idle serving cell does not belong to any serving cell subset;

a detection unit, configured to detect whether a terminal enters the idle serving cell determined by the idle cell determining unit; and an instruction sending unit, configured to: instruct a first access device corresponding to the idle serving cell to enter a sleep state; and if the detection unit detects that a terminal enters the idle serving cell, activate the first access device corresponding to the idle serving cell.

A third aspect of the embodiments of the present invention further provides a wireless network, including at least two access devices, where:

the at least two access devices include at least one access device, according to the embodiments of the present invention, that is used as a second access device and at least one access device, according to the embodiments of the present invention, that is used as a first access device.

It can be learned from the above technical solutions that the embodiments of the present invention have the following advantages: Access devices are classified into two types. One type is a second access device that has a centralized management function, and the other type is a first access device that provides a serving cell. When the second access device needs to send downlink data, the second access device sends the downlink data and scheduling information to a first access device corresponding to at least one serving cell in a serving cell subset. Therefore, flexible wireless deployment or wired deployment of a macro cell, a small cell, and a pico cell can be implemented. Each first access device sends downlink data to a terminal on a resource indicated by scheduling information, and the terminal correspondingly receives, on the resource indicated by the scheduling information, the downlink data sent by each first access device. In this way, the terminal can obtain a combination gain, reliability of transmitting the downlink data and the scheduling information is improved, and downlink data transmission performance is enhanced.

BRIEF DESCRIPTION OF DRAWINGS

To describe technical solutions in embodiments of the present invention more clearly, the following briefly describes accompanying drawings for describing the embodiments. The accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention clearer, the following further describes the present invention in detail with reference to the accompanying drawings. The described embodiments are merely some rather than all of the embodiments of the present invention. All other embodiments obtained by persons of ordinary skill in the art based on the embodiments of the present invention without creative efforts shall fall within the protection scope of the present invention.

Figure 1:
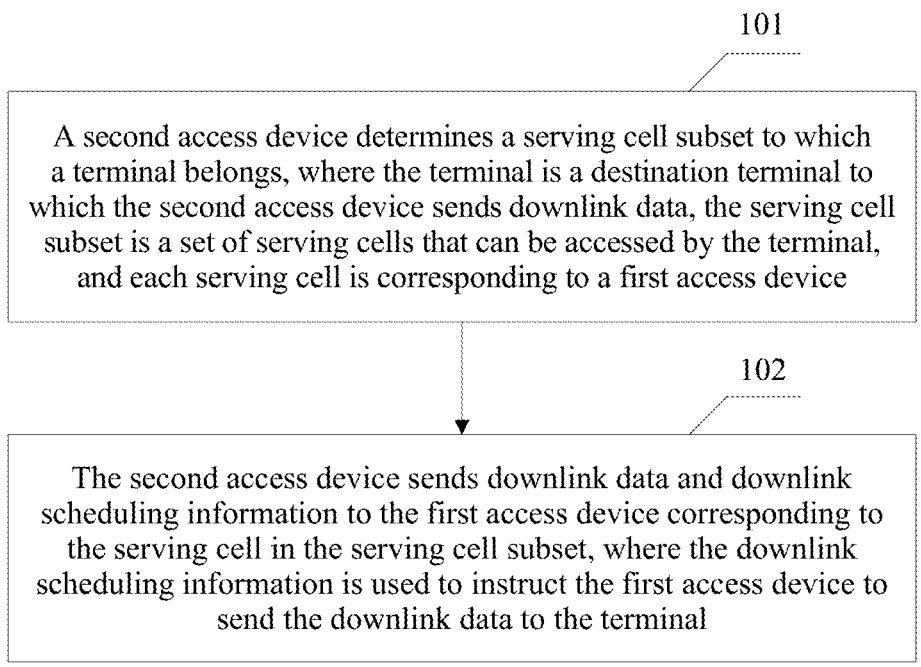
FIG. 1 is a schematic flowchart of a method according to an embodiment of the present invention.

An embodiment of the present invention provides a wireless network scheduling method. As shown in FIG. 1, the method includes the following steps.

101. A second access device determines a serving cell subset to which a terminal belongs, where the terminal is a destination terminal to which the second access device sends downlink data, the serving cell subset is a set of serving cells that can be accessed by the terminal, and each serving cell is corresponding to a first access device.

In this embodiment of the present invention, the first access device is corresponding to a serving cell that can be accessed by the terminal (that is, a serving cell that can serve the terminal), and the second access device is an access device that has a centralized control function. To distinguish the two different types of access devices, terms "first" and "second" are used for distinguishing. The terms "first" and "second" have no technical meaning, shall not be understood as a limitation on this embodiment of the present invention, and are not described one by one again in subsequent embodiments. Generally, there are many serving cells that can be accessed by the terminal. Therefore, the serving cell subset includes many serving cells.

In this embodiment of the present invention, the first access device may also be corresponding to a serving cell that can serve the terminal. Therefore, the "serving cell subset" may be corresponding to a set of serving cells that can serve the terminal. It can be understood that the serving cell subset should include at least one serving cell. In addition, one access device may provide many serving cells. Therefore, in this embodiment of the present invention, two or more serving cells may be corresponding to a same access device.

It can be understood that the second access device may also provide a serving cell that is accessed by the terminal, or provide a serving cell that serves the terminal. In this case, the second access device and the first access device may be physically a same access device. This is not limited in the present invention.

102. The second access device sends downlink data and downlink scheduling information to the first access device corresponding to the serving cell in the serving cell subset, where the downlink scheduling information is used to instruct the first access device to send the downlink data to the terminal.

In this embodiment of the present invention, the downlink data and the downlink scheduling information are information that needs to be transmitted on an air interface. The downlink scheduling information is finally sent to the terminal. The downlink scheduling information is information used to instruct the first access device to send the downlink data. In the scheduling information, a parameter that is used when the first access device sends the downlink data may be specified. Because both the first access device and the second access device may be access devices corresponding to serving cells in the serving cell subset, a process in which the terminal obtains the downlink scheduling information may be as follows: The second access device and/or the first access device corresponding to the serving cell in the serving cell subset send/sends the downlink scheduling information to the terminal. After receiving the downlink scheduling information, the terminal may receive the downlink data according to the received downlink scheduling information.

In the above embodiment, access devices are classified into two types. One type is a second access device that has a centralized management function, and the other type is a first access device that provides a serving cell. When the second access device needs to send downlink data, the second access device sends the downlink data and scheduling information to a first access device corresponding to a serving cell in a serving network cell subset. Therefore, flexible wireless deployment or wired deployment of a macro cell, a small cell, and a pico cell is implemented. Each first access device sends downlink data to a terminal on a resource indicated by scheduling information, and the terminal correspondingly receives, on the resource indicated by the scheduling information, the downlink data sent by each first access device. In this way, the terminal can obtain a combination gain, reliability of transmitting the downlink data and the scheduling information is improved, and downlink data transmission performance is enhanced.

In this embodiment of the present invention, the first access device and the second access device may communicate by using an interface between the access devices, such as an X2 interface between eNodeBs. There may be no interface for direct communication between the first access device and the second access device. In this case, forwarding may be performed by using another access device, and a specific solution is as follows: The sending downlink data and downlink scheduling information includes: sending the downlink data and the downlink scheduling information by using an interface between the first access device and the second access device; or sending the downlink data and the downlink scheduling information to a third access device, and instructing the third access device to forward the downlink data and the downlink scheduling information to the first access device corresponding to the serving cell in the serving cell subset.

In this embodiment, an implementation manner in which the second access device instructs the third device to perform forwarding may be as follows: Instruction information is added to the downlink scheduling information to instruct the third device to perform forwarding; or the third access device is configured as a default forwarding device (that is, the third access device performs forwarding provided that the third access device receives the downlink data and the downlink scheduling information); or an independent message is sent to instruct the third device to perform forwarding; or an address of the first access device may be added to the downlink data and the downlink scheduling information, so that the third access device performs forwarding according to the address of the first access device. Therefore, an instruction manner may be explicit or may be implicit, and a specific instruction manner is not uniquely limited in this embodiment of the present invention.

In this embodiment of the present invention, because each first access device delivers scheduling information to the terminal and sends downlink data on a resource specified by the scheduling information, according to a protocol specification, each first access device receives first feedback information on the resource specified by the scheduling information. Therefore, there is also a combination gain when the first feedback information is forwarded to the second access device, and transmission performance of the first feedback information is also improved. Specifically, after the downlink data and the downlink scheduling information are sent, the method further includes: receiving, by the second access device, first feedback information sent by the first access device corresponding to the serving cell in the serving cell subset; and determining, according to the first feedback information, whether the terminal successfully or unsuccessfully receives the downlink data.

After the first feedback information is received, how to determine whether the terminal successfully or unsuccessfully receives the downlink data may be specifically as follows: The determining, according to the first feedback information, whether the terminal successfully or unsuccessfully receives the downlink data includes:

if the received first feedback information indicates that first access devices of a specified quantity or a specified proportion successfully receive the downlink data, determining that the terminal successfully receives the downlink data; or if the first feedback information indicates that a quantity or a proportion of first access devices that successfully receive the downlink data is less than a specified quantity or a specified proportion, confirming that the terminal unsuccessfully receives the downlink data.

In this embodiment of the present invention, the first feedback information is information that is used to determine a status of receiving the downlink data by the terminal. The first feedback information may carry information of many types, for example, information that indicates whether a piece of downlink data is successfully received or unsuccessfully received, information that indicates specific downlink data that is successfully received and specific downlink data that is unsuccessfully received, or statistical information of successfully-receiving information, such as a proportion of downlink data that is successfully/unsuccessfully received or a quantity of downlink data that is successfully/unsuccessfully received. Therefore, the first feedback information may be of many types according to a requirement. Whether the terminal successfully or unsuccessfully receives the downlink data may be determined according to different types of feedback information in a corresponding determining manner. The above specific determining manner should not be understood as a uniqueness limitation on this embodiment of the present invention.

In this embodiment, both the specified quantity and the specified proportion may be set by persons of skills according to experience, or may be set according to a quality requirement for downlink data transmission. Theoretically, the terminal may successfully receive the downlink data provided that one piece of first feedback information displays that the terminal successfully receives the downlink data. A higher specified quantity or proportion can improve accuracy of determining that the terminal successfully receives the downlink data. In this embodiment, a specific parameter of the specified quantity and that of the specified proportion are not uniquely limited.

In this embodiment of the present invention, if the second access device determines that the terminal unsuccessfully receives the downlink data, this embodiment of the present invention further provides an implementation solution of automatic retransmission. The solution is as follows: If it is determined that the terminal unsuccessfully receives the downlink data, the method further includes: if the second access device has a control function of a radio link control layer and that of an upper layer, instructing, by the second access device, the radio link control layer to perform an operation of retransmitting an automatic repeat request. In this embodiment, when the radio link control layer performs the operation of retransmitting the automatic repeat request, data that is unsuccessfully transmitted may be retransmitted.

According to different protocol specifications or configurations, if the first access device has the control function of the radio link control layer and that of the upper layer, the first access device may complete automatic retransmission. Therefore, that the second access device performs automatic retransmission is not a unique optional implementation solution.

The above embodiment is mainly used to schedule downlink data. This embodiment of the present invention further provides scheduling of uplink data. Specifically, after the second access device determines the serving cell subset to which the terminal belongs, the method further includes:

sending, by the second access device, uplink scheduling information to the first access device corresponding to the serving cell in the serving cell subset, where the uplink scheduling information is used to instruct to grant the terminal permission to send uplink data on a resource specified by the uplink scheduling information; and receiving, by the second access device, uplink data forwarded by the first access device corresponding to the serving cell in the serving cell subset.

In this embodiment of the present invention, the uplink scheduling information is finally sent to the terminal, so that the terminal sends the uplink data according to the uplink scheduling information. Because both the first access device and the second access device may be access devices corresponding to serving cells in the serving cell subset, a process in which the terminal obtains the uplink scheduling information may be as follows: The second access device and/or the first access device corresponding to the serving cell in the serving cell subset send/sends the uplink scheduling information to the terminal, so that the terminal sends the uplink data according to the uplink scheduling information. After receiving the uplink scheduling information, the terminal may send the uplink data on the resource specified by the uplink scheduling information. Each first access device receives the uplink data on the resource specified by the uplink scheduling information, and although the terminal needs to send only one piece of data, each first access device forwards the data to the second access device. Therefore, the second access device may obtain a combination gain, so that reliability of transmitting the uplink data is improved, and uplink data transmission performance is enhanced.

In this embodiment of the present invention, the first access device may have different choices to forward the uplink data according to a capability. Specifically, uplink data forwarded by each first access device includes:

uplink data that is obtained after each first access device decodes the uplink data and that is forwarded after the first access device confirms that the uplink data is successfully received, or uplink data that is forwarded when each first receiving device does not confirm that the uplink data is successfully received.

If the uplink data forwarded by each first access device is the uplink data that is forwarded when each first receiving device does not confirm that the uplink data is successfully received, the method further includes:

combining and decoding, by the second access device, the uplink data forwarded by the first access devices.

In this embodiment, after determining that the uplink data is successfully received, the first access device may decode the uplink data and forward the decoded data. A data amount after the decoding is far less than an original data amount. Therefore, occupancy of bandwidth between the access devices may be reduced. In addition, if the first access device does not perform the steps of decoding and confirming whether the uplink data is successfully received, the first access device may directly forward the received uplink data. In this way, the second access device may obtain a combination gain when performing combination and decoding. Even if the first access device directly performs forwarding, compared with transmitting, in both an uplink direction and a downlink direction, a signal that is encoded but not decoded, 50% of bandwidth may be still reduced (bandwidth required for transmitting the original signal that is encoded but not decoded is far greater than bandwidth required for transmitting data obtained after the original signal is decoded (a data amount is equivalent to a data amount before encoding), that is, compared with transmitting original data, the bandwidth required for transmitting the data obtained after the original signal is decoded may be ignored. Therefore, if the original signal that is not decoded is transmitted only in one direction such as in the uplink direction, and a signal that is not encoded is transmitted in the other direction such as in the downlink direction, compared with transmitting, in both of the two directions, the original signal that is encoded but not decoded, bandwidth is reduced by approximately half). In addition, if a manner of forwarding the original signal and that of forwarding a decoded signal are combined when the uplink data is transmitted, that is, the first access device forwards the decoded signal if the first access device can correctly perform decoding, or forwards the original signal if the first access device cannot successfully perform decoding. In this case, an amount of data that needs to be forwarded is less than that of the original signal that is directly forwarded, so as to reduce transmission bandwidth.

In a current communications protocol, a processing procedure in which an access device provides an uplink grant for a terminal is as follows: When having uplink data that needs to be sent, the terminal needs to first send a scheduling request to a second access device and/or a first access device. Then the second access device and/or the first access device send/sends an uplink grant to the terminal based on the received scheduling request. Further, the terminal sends a buffer status report to the second access device (the buffer status report may be directly sent to the second access device, may be sent to the second access device by using the first access device, or may be sent to the second access device in a combination of the two manners). Then the second access device sends the uplink grant to the terminal again based on the status report (the uplink grant may be directly sent to the terminal, may be sent to the terminal by using the second access device, or may be sent to the terminal in a combination of the two manners). The terminal sends the uplink data based on the uplink grant. There is a delay of approximately 10 ms in this process. This embodiment of the present invention may be implemented in a blind scheduling manner to reduce the delay. Specifically, the sending, by the second access device, uplink scheduling information to the first access device corresponding to the serving cell in the serving cell subset includes:

after determining the serving cell subset to which the terminal belongs, if no scheduling request and/or no buffer report of the terminal device are/is received, sending, by the second access device, the uplink scheduling information to the first access device corresponding to the serving cell in the serving cell subset.

Blind scheduling in this embodiment of the present invention means that the second access device does not need to receive the scheduling request and/or the buffer status report of the terminal, but directly sends an uplink grant to the terminal. In this case, if having uplink data, the terminal sends the uplink data to a base station according to the uplink grant. This greatly reduces an uplink data transmission delay.

In a process of using the blind scheduling, if the terminal has no uplink data to send, according to the current protocol, the terminal needs to send uplink data without a valid data packet according to the uplink grant. Consequently, power is wasted and even a neighboring cell or terminal may be interfered. To resolve the above problem and reduce unnecessary power consumption of the terminal, this embodiment of the present invention may be as follows: After the second access device determines the serving cell subset to which the terminal belongs, the method further includes: sending, by the second access device, first configuration information to the first access device corresponding to the serving cell in the serving cell subset and/or the terminal, where the first configuration information is used to configure the first access device and/or the terminal to skip sending uplink data without a valid data packet when there is no uplink data, or to send only an uplink grant acknowledgment message when there is no uplink data, and the uplink grant acknowledgment message is used to indicate that there is no uplink data. The uplink grant acknowledgment message may be specifically a message sent on a physical uplink control channel. In addition, a specific resource used for the message may be determined according to an initial location of a physical resource CCE occupied by the uplink grant. Specifically, for example, a location of an uplink control channel=an initial CCE location+an offset. The offset may be configured by a higher layer, such as an RRC (radio resource control) message, or may be fixed in the protocol.

An implementation solution of the blind scheduling in this embodiment may be independently implemented, and does not need to depend on a network architecture, proposed in this embodiment of the present invention, that includes the first access device and the second access device.

In this embodiment of the present invention, the first access device may have a function of supporting information sending configuration. Therefore, to improve network compatibility, the first access device may first report a capability of the first access device, then the second access device configures a first access device that supports the configuration, and those first access devices that do not support the configuration may still forward data in their original manners. Therefore, an objective of compatibility and flexible control is achieved. Specifically, before the second access device sends the first configuration information to the first access device corresponding to the serving cell in the serving cell subset, the method further includes:

receiving, by the second access device, capability information of the terminal that is forwarded by the terminal by using the first access device corresponding to the serving cell in the serving cell subset; and if the second access device confirms, according to an instruction of the capability information, that the terminal supports skipping sending the uplink data without a valid data packet when there is no uplink data, sending the first configuration information to the first access device corresponding to the serving cell in the serving cell subset; or if the second access device confirms, according to an instruction of the capability information, that the terminal supports sending, when there is no uplink data, only the uplink grant acknowledgment message that is used to indicate that there is no uplink data, sending the first configuration information to the first access device corresponding to the serving cell in the serving cell subset.

When the terminal performs uplink HARQ (Hybrid Automatic Repeat Request, hybrid automatic retransmission) feedback according to the status of receiving the downlink data, a feedback resource (an uplink control channel) of the terminal is determined according to an initial location of a physical resource CCE occupied by scheduling information for scheduling the downlink data. Specifically, for example, a location of an uplink control channel=an initial CCE location+an offset. The offset may be configured by a higher layer, such as an RRC (radio resource control) message, or may be fixed in the protocol. The scheduling information may occupy CCEs of different quantities, such as one CCE, two CCEs, four CCEs, or eight CCEs, to adapt to different channel environments, so as to ensure reliable transmission of the scheduling command. However, when the scheduling information occupies multiple CCEs, the feedback resource is still associated with the initial CCE location, and reliability of second feedback information is affected. Consequently, the second feedback information is lost or wrong. This embodiment of the present invention provides a solution based on this. The solution is as follows: Before the second access device sends the uplink scheduling information to the first access device corresponding to the serving cell in the serving cell subset, the method further includes:

sending, by the second access device, second configuration information to the first access device corresponding to the serving cell in the serving cell subset, and instructing the first access device corresponding to the serving cell in the serving cell subset to forward the second configuration information to the terminal, where the second configuration information is used to instruct to determine, when the uplink scheduling information occupies at least two control channel elements CCEs, a CCE that should be used for a feedback resource and a location of the used CCE, and the feedback resource is a feedback resource that is used by the terminal to send second feedback information to the first access device and/or the second access device.

In this embodiment, an implementation manner in which the second access device instructs the first access device to perform a forwarding operation may be as follows: Instruction information is added to the second configuration information to instruct the first access device to perform the forwarding operation; or an address of the terminal is specified in a message carrying the second configuration information, so that the first access device forwards the second configuration information to the terminal; or an independent instruction message is additionally sent to instruct the first access device to perform the forwarding operation. An implementation solution in which the second access device specifically instructs the first access device to forward the second configuration information is not uniquely limited in this embodiment of the present invention.

Further, the terminal may add encoding redundancy information to improve feedback information reliability. Specifically, the method further includes:

receiving, by the second access device, second feedback information that is uniformly encoded and respectively and repeatedly sent by the terminal device by using at least two feedback resources.

It can be understood that the method in which the terminal sends the uplink grant acknowledgment message, the capability reporting method, and the function configuration method are also applicable to a scenario in which the terminal has only one serving cell, a carrier aggregation scenario, a dual connectivity scenario, or the like. For example, in the scenario in which there is only one serving cell, the second access device and the first access device may be combined into one access device. Details are not described herein.

This embodiment of the present invention further provides a cell subset determining manner. Specifically, the determining, by a second access device, a serving cell subset to which a terminal belongs includes:

determining, by the second access device, a serving cell set, where the serving cell set is a set of serving cells that are managed by the second access device;

broadcasting, by the second access device, a measurement instruction message to a first access device corresponding to a serving cell in the serving cell set, so that the first access device corresponding to the serving cell in the serving cell set forwards the measurement instruction message to the terminal, where the measurement instruction message is used to instruct the terminal to measure a downlink pilot, or is used to instruct any terminal to measure a downlink pilot; and determining, according to measurement result information forwarded by each first access device, a set of serving cells that can be accessed by the terminal as the serving cell subset to which the terminal belongs.

In this embodiment of the present invention, the second access device has a function of managing the first access device. For this point, the management function of the second access device can be learned from the solution of this embodiment of the present invention. In addition, the first access device provides a serving cell that is accessed by the terminal. Therefore, all serving cells provided by all first access devices that can be managed by the second access device should belong to the serving cells that are managed by the second access device. A set of these serving cells is the set of serving cells that are managed by the second access device.

In this embodiment of the present invention, a measurement result of the downlink pilot is used to indicate whether the terminal can access the first access device and whether access quality meets a requirement, and thereby is used to determine a serving cell that can be used as a serving cell in the serving cell subset and is in the serving cells that can be accessed by the terminal. Based on this objective, in this embodiment of the present invention, the measurement result of the downlink pilot may meet this requirement in various forms. Specifically, the measurement result information includes:

at least one of all downlink pilot measurement results, a downlink pilot measurement result that meets a configuration condition, or information about a correspondence between a terminal identity and a serving cell that can be accessed, where the measurement results are received by the first access device corresponding to the serving cell in the serving cell set.

In this embodiment of the present invention, the second access device may repeatedly perform broadcasting the measurement instruction message to the first access device. After repeated sending, a serving cell subset is determined again. In this way, the serving cell subset may be dynamically updated. Specifically, the broadcasting, by the second access device, a measurement instruction message to a first access device corresponding to a serving cell in the serving cell set includes:

repeatedly performing, by the second access device according to a preset rule, broadcasting the measurement instruction message to the first access device corresponding to the serving cell in the serving cell set.

In this embodiment, the measurement instruction message is repeatedly sent and broadcast to update the serving cell subset. Therefore, there are some technical requirements for updating the serving cell subset, such as timeliness of the updating and a limitation on a system resource occupied by the updating. The used "preset rule" may be periodic, or may be event-triggered. For example, a time period for periodically broadcasting the measurement instruction message may be adjusted, or broadcasting of the measurement instruction message may be triggered in an event triggering manner. A basis of adjusting the time period may come from monitored data of the second access device. For example, if the terminal is frequently handed over between serving cells accessed by the terminal, it indicates that a timelier update is needed and that the time period needs to be shortened. Alternatively, if an updated proportion or quantity of serving cells in the serving cell subset is less than a preset threshold after the measurement instruction message is broadcast for two consecutive times, the time period may be extended. The "preset rule" used to control broadcasting of the measurement instruction message may be set according to different technical index requirements, and is not uniquely limited in this embodiment of the present invention.

In this embodiment of the present invention, sometimes, there may be no terminal that needs to access a wireless network by using the first access device. In this case, the first access device may sleep to save power. Based on this, this embodiment of the present invention provides a specific implementation solution to controlling the first access device to enter a sleep state and activating the first access device. The solution is as follows: The method further includes:

determining, by the second access device, a serving cell set, where the serving cell set is a set of serving cells that are managed by the second access device;

determining an idle serving cell in the serving cell set, where the idle serving cell does not belong to any serving cell subset;

instructing a first access device corresponding to the idle serving cell to enter a sleep state; and if it is detected that a terminal enters the idle serving cell, activating the first access device corresponding to the idle serving cell.

In this embodiment, because the idle serving cell does not belong to any serving cell subset, no terminal can access the idle serving cell currently. Therefore, the idle serving cell is inevitably in an idle state. In this case, an access device corresponding to the idle serving cell may enter a sleep state. "Active" and "sleep" are two operating states of the access device. The sleep state is a state in which data transmission does not need to be performed. In this state, the terminal cannot perform access. The subsequently activated first access device is opposite to the sleep state. The activated first access device has a data transmission function, and a first serving cell provided by the first access device can be accessed by the terminal. In this embodiment, a manner of activating the first access device corresponding to the idle serving cell may be as follows: Instruction information is sent to the first access device corresponding to the idle serving cell, to instruct the first access device to switch the operating state to an active state. How to specifically enable the first access device to complete switching of the operating state from the sleep state to the active state is not uniquely limited in this embodiment of the present invention.

Figure 2:
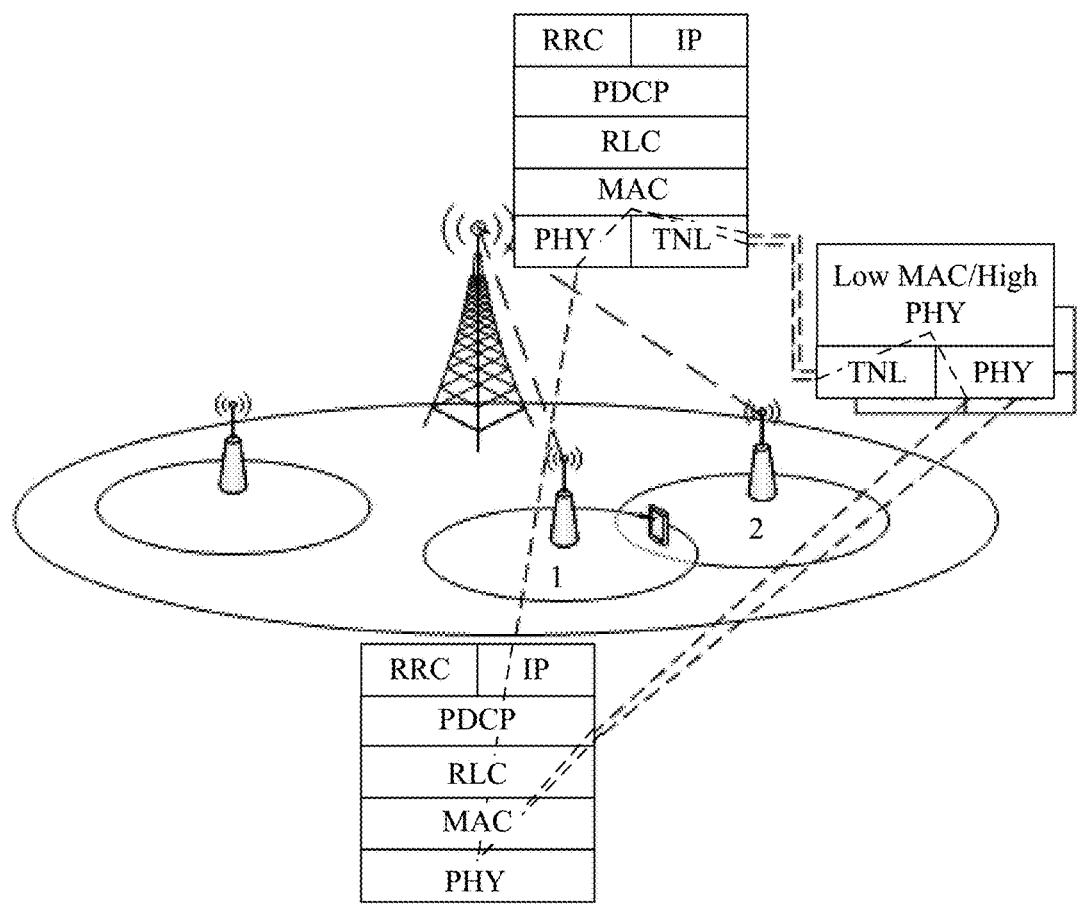
FIG. 2 is a schematic structural diagram of a system and a protocol stack according to an embodiment of the present invention.

In the following embodiment, a second access device is named after a centralized control node and is corresponding to a macro cell, and a second access device is named after a node and is corresponding to a small cell. The macro cell and the small cell use intra-frequency coverage. For a terminal, user equipment (UE) is used as an example. A specific architecture and a protocol stack are shown in FIG. 2 and have the following features.

Neighboring small cells may share a same cell identity (such as a PCI (physical cell identifier)), or use a same virtual cell identity (Virtual Cell ID), or neighboring small cells use different cell identities. A macro cell and a small cell, or a small cell and a small cell, or even a macro cell and a macro cell may be connected by using a non-ideal backhaul link. The non-ideal backhaul link may be understood as a link in which a transmission delay cannot be ignored. Specifically, the non-ideal backhaul link may be a licensed spectrum or an unlicensed spectrum, or may be a network cable, such as a Category 5 enhanced network cable or an Augmented Category 6 network cable. This is not specifically limited in the present invention. Certainly, if an ideal backhaul link can be deployed, this embodiment of the present invention is also applicable.

In multiple macro cells and/or small cells, one node (which may be a macro cell or may be a small cell) implements a centralized control function, and is referred to as a centralized control node. Specific functions may include: (1) pre-scheduling; (2) determining a serving cell set of the user equipment; (3) user equipment mobility management; (4) performing signaling interaction with another node, configuring a function of another node, controlling a behavior of another node, receiving information about another node, and the like.

Except the centralized control node, functions of another node (which may be a macro cell or may be a small cell) include: (1) performing data transmission and/or retransmission according to a command of the centralized control node; (2) receiving, according to a command of the centralized control node, feedback information sent by the user equipment, such as an HARQAck (Hybrid Automatic Repeat Request Ack, hybrid automatic repeat request-acknowledgment) or a NACK (Not Acknowledge, negative acknowledgment), and a measurement report, such as CQI (Channel Quality Indicator, Channel Quality Information), a PHR (power headroom report), RSRP (reference signal received power), or RSRQ (reference signal received quality). The architecture in this embodiment of the present invention barely affects user equipment, and the solution of this embodiment of the present invention may be implemented by using original user equipment.

In FIG. 2, user equipment is located at an intersection of a small cell of an access device 1 and that of an access device 2. The user equipment can access the two small cells, and the two small cells belong to a serving cell subset. Both the access device 1 and the access device 2 are first access devices. In FIG. 2, an access device of a larger tower shape provides a centralized control function and is a second access device.

A protocol stack of the centralized control node is a macro/controller protocol stack. Protocol stacks from top to bottom are successively:
 RRC: radio resource control;
 IP: Internet Protocol;
 PDCP: Packet Data Convergence Protocol;
 RLC: radio link control;
 MAC: Medium Access Control, Media Access Control;
 PHY: Physical, physical layer; and
 TNL: Transportation Network Layer, transport network layer.

The PDCP implements security data forwarding. The RRC implements enhanced mobility resource management (Enhanced Mobility Resource Manage). The MAC implements centralized scheduling flow control.

A protocol stack of a node corresponding to the small cell is a pico protocol stack, including low MAC/high PHY, PHY, and a TNL.

The low MAC/high PHY implements simple buffer HARQ (Simple buffer HARQ ReTx).

UE-side protocol stacks (user equipment protocol stack) from top to bottom are successively: RRC, the IP, the PDCP, RLC, MAC, and PHY. The PHY implements measurement (radio resource management (RRM)/CQI (M/P (Macro/Pico))) and feedback (A/N (Ack/Nack) (M/P)).

In FIG. 2, the centralized control node and another node may be connected in a wired manner or may be connected in a wireless manner. Protocol layers connected by using dashed lines indicate protocol layers that exchange information.

The following embodiment designs in detail the functions of the centralized control node and those of the another node mentioned in this embodiment.

Further, optionally, the protocol stack of the small cell may be a protocol stack that has one or a combination of the following protocol functions:
 a protocol stack that has only a PHY function; or
 a protocol stack that has a PHY function and partial MAC layer functions; or
 a protocol stack that has a PHY function and complete MAC layer functions; or
 a protocol stack that has a PHY function, a MAC layer function, and an RLC function; or
 a protocol stack that has a PHY function, a MAC layer function, an RLC layer function, and a PDCP function; or
 a protocol that has a PHY function, a MAC layer function, an RLC layer function, a PDCP function, and an RRC function.

In the final case, the node corresponding to the small cell may independently provide a service for the user equipment.

In the foregoing different protocol stack modes, functions implemented by the node corresponding to the small cell are different. More protocol layers indicate more functions implemented by the node corresponding to the small cell, and optionally, indicate stronger independence. For example:

When the small cell has only the physical layer function, the small cell is only responsible for transmitting and receiving data, according to an instruction of the centralized control node, and does not implement a function of a higher layer protocol stack at all, such as scheduling or retransmission. In this case, it can be considered that the small cell completely has no independence capability.

When the small cell has the physical layer function and the partial MAC layer functions, the small cell has partial retransmission functions, but still has no complete independent scheduling function, and is basically controlled by the centralized control node.

When the small cell has the physical layer function and the complete MAC layer functions, the small cell has partial scheduling functions in at least a specific range, for example, performs scheduling on a resource that is not scheduled by the centralized control node, or performs scheduling on a resource that is allowed for scheduling and configured by the centralized control node.

When having the protocol stack including the PHY function, the MAC layer function, and the RLC function, the small cell has a function such as segmentation of the RLC. By analogy, a more complete protocol stack of the small cell indicates more functions that the small cell has. Whether the small cell has all protocol stack functions or has only some protocol stack functions may be flexibly configured according to a requirement. How to configure the protocol stack of the small cell is not uniquely limited in this embodiment of the present invention.

Figure 3:
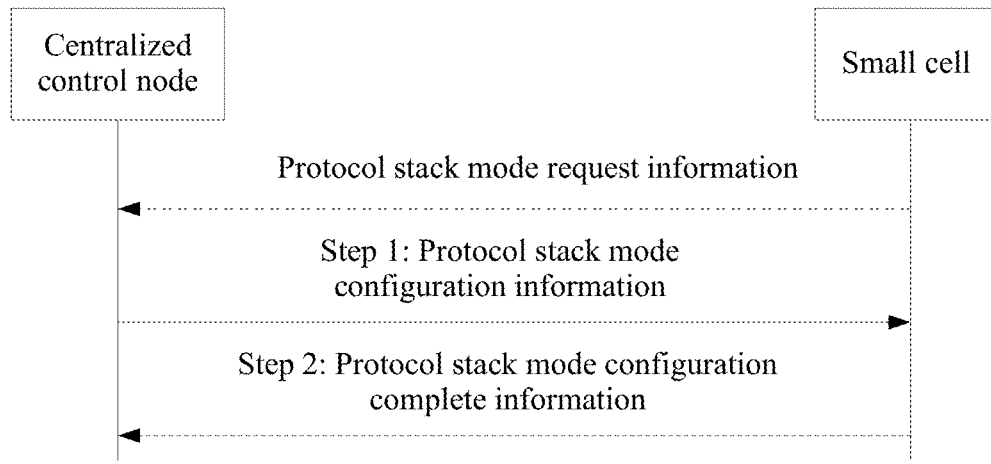
FIG. 3 is a schematic flowchart of a method according to an embodiment of the present invention.

In a specific application process, different protocol stack functions may be applied and used according to different scenarios and a capability of the node corresponding to the small cell, that is, multiple protocol stack functions may be mutually switched. For convenience of description, the node corresponding to the small cell is briefly described as a small cell. Typically, as shown in FIG. 3, a protocol stack configuration procedure may be as follows.

Step 1: The centralized control node sends protocol stack mode configuration information to the small cell, to notify the small cell of a to-be-used protocol stack mode.

It can be understood that the protocol stack mode configuration information may be transferred by using an X2 interface message of an interface, such as an X2 interface, between the centralized control node and the small cell. This is not limited in this embodiment of the present invention.

A specific notification form of notifying the small cell of the to-be-used protocol stack mode may be as follows: For example, one or more of the foregoing protocol stack modes are numbered, each number represents a protocol stack mode, and the protocol stack mode configuration information carries the numbers, to notify the small cell of a specific protocol stack mode.

More specifically, for example, a number 1 indicates that there is only a PHY function, and a number 2 indicates that there are a PHY function, partial MAC layer functions, and the like. When notification is performed, the small cell needs to be notified of only the number 1 or 2.

A specific notification form of notifying the small cell of the to-be-used protocol stack mode may also be as follows: For example, the small cell is notified of whether a specific protocol layer is used, for example, whether there is a PHY layer, whether there is a MAC layer, or whether there is an RLC layer. This manner may also achieve an objective of notifying the small cell of the protocol stack mode.

Further, a bitmap (bitMap) manner may be used. For example, a, b, c, d, and e are used to respectively represent PHY, a MAC layer, RLC, a PDCP layer, and RRC, a=1 represents that a physical layer protocol stack is used, a=0 represents that a physical layer protocol stack is not used, and so on.

The objective of notifying the small cell of the to-be-used protocol stack mode may be achieved in another form. This is not limited herein.

Optionally, before step 1, the small cell may send protocol stack mode request information to the centralized control node. The information is used to request the protocol stack mode that is to be used by the small cell. This step is used to trigger the centralized control node to deliver the protocol stack mode configuration information.

Further, optionally, the protocol stack mode request information may carry a protocol stack mode that the small cell expects to use, to achieve a negotiation objective. The protocol stack mode request information may carry a protocol stack mode supported by the small cell.

Step 2: The small cell sends protocol stack mode configuration complete information to the centralized control node. This step is optional.

It can be understood that the process may be a process in which user equipments are not distinguished. For example, once a protocol stack mode is configured for the small cell, all user equipments of the small cell use the mode.

It can be understood that the process may be a process in which user equipments are distinguished. For example, for a user equipment or some user equipments, the small cell uses a protocol stack mode, and for another user equipment or some other user equipments, the small cell uses another protocol stack mode. This is not limited in this embodiment of the present invention.

Further, when the process is the process in which user equipments are distinguished, a message between the small cell and the centralized control node that are involved in the procedure may carry information that can identify the user equipments, such as a C-RNTI (cell radio network temporary identity) or a TMSI (temporary mobile subscriber identity), or other information that can identify the user equipments; or may be transmitted on a transmission channel that can identify the user equipments. This is not limited in this embodiment of the present invention.

It can be understood that a protocol stack mode configuration function provided in this embodiment of the present invention not only can be used for mode configuration for the small cell for the first time, but also can be used for mode switching, that is, a mode of the small cell may be changed, and the protocol stack mode may be changed based on changes of scenarios and services.

When the user equipments are not distinguished, the protocol stack configuration procedure is further combined with the following process.

Figure 4:
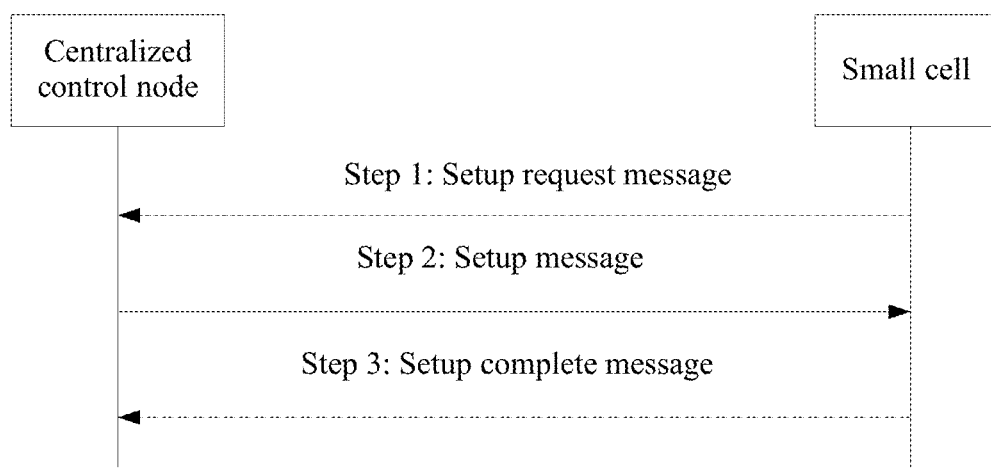
FIG. 4 is a schematic flowchart of a method according to an embodiment of the present invention.

When a small cell is just deployed, the small cell needs to report to work to a centralized control node to which the small cell belongs. As shown in FIG. 4, a specific report-to-work process may be as follows:

Step 1: The small cell sends a setup request message to the centralized control node.

In this step, the setup request message carries an identity of the small cell. The identity may be a specific number identity, and/or may be a type identity identifying, for example, that this node is a small cell type.

The process is similar to a process in which current user equipment establishes an RRC connection. Details are not described herein.

Optionally, if this step is combined with the protocol stack mode process, the request message may further carry a protocol stack mode that the small cell expects to use.

Step 2: The centralized control node sends a setup message to the small cell.

In this step, the setup message may carry configuration information of the small cell. The configuration information may specifically include:

1. a resource used when the small cell serves user equipment, such as a frequency, bandwidth, or a channel resource configuration that includes a small cell common resource configuration, a small cell set common resource configuration, and the like;

2. a resource used when the small cell performs backhaul transmission with the centralized control node, such as a frequency, bandwidth, or a channel resource configuration;

3. a protocol stack mode used when the small cell serves user equipment;

4. other configuration information, such as bearer configuration information or transmission channel configuration information.

Step 3: The small cell sends a setup complete message to the centralized control node. This step is an optional step.

The following embodiments describe, in more detail and by using an example, the functions of the centralized control node and those of the another node mentioned in this embodiment of the present invention.

Figure 5:
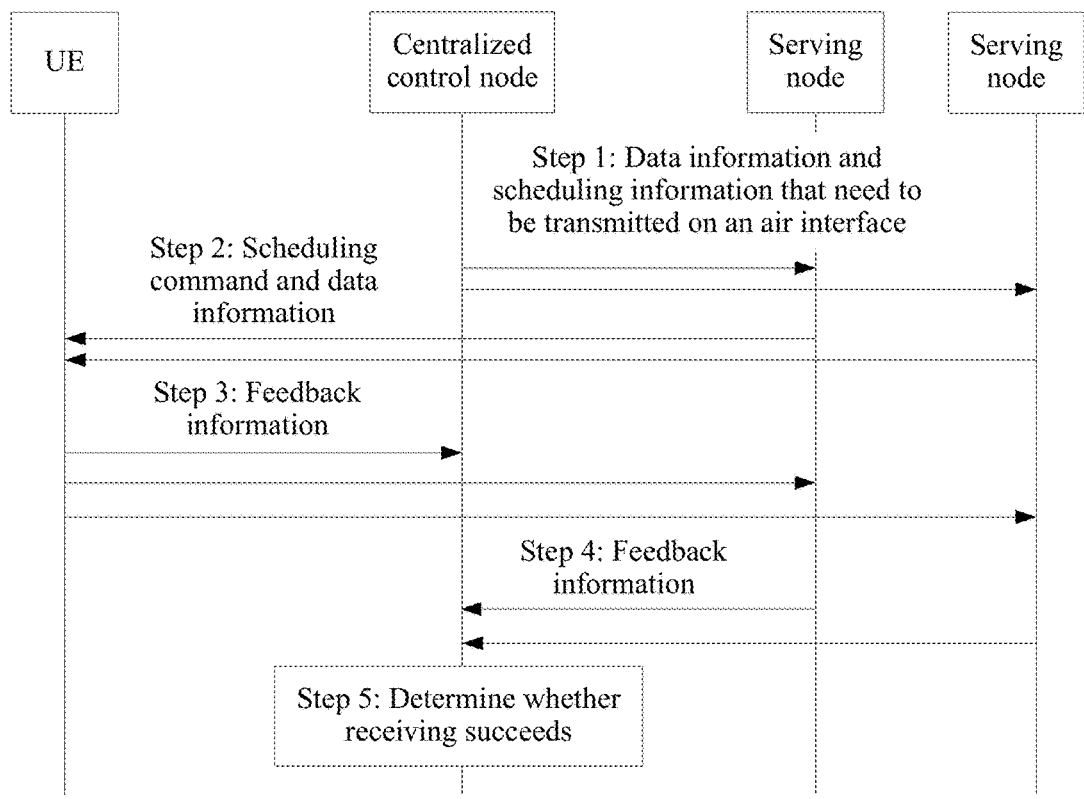
FIG. 5 is a schematic flowchart of a method according to an embodiment of the present invention.

1. As shown in FIG. 5, a procedure of a method for implementing a downlink pre-scheduling function includes the following steps.

Step 1: A centralized control node sends, to a serving node in a serving cell subset, data information and scheduling information that need to be transmitted on an air interface.

There is at least one serving cell in the serving cell subset, and the serving cell is corresponding to a serving node. Therefore, the data information and the scheduling information that need to be transmitted on the air interface are sent to at least one serving node. A subsequent embodiment describes in detail how to determine the serving cell subset.

In this step, the data information includes data content that needs to be transmitted on the air interface. Generally, the data content may be a MAC (measurement and control) PDU (protocol data unit).

In this step, the scheduling information that needs to be transmitted on the air interface may specifically include at least one or more of the following. Generally, the scheduling information in the following may be a MAC CE (control element) or may be another message.

1. A parameter of data (or content of a scheduling command), including at least one of the following:
a physical resource used for data transmitted on the air interface;
a modulation and coding scheme used for data transmitted on the air interface;
a number of an antenna port used for data transmitted on the air interface;
a masking manner used for data transmitted on the air interface, such as a C-RNTI (cell radio network temporary identity), which is used to represent specific user equipment whose data is scheduled; or
a time for data transmitted on the air interface, such as a specific subframe of a specific radio frame.

The above parameters of the data are used to notify a serving node that sends the data to the user equipment of a specific manner that should be used to send the data.

2. A parameter of a scheduling command:
a physical resource used for a scheduling command corresponding to data transmitted on the air interface, such as an enhanced physical downlink control channel (ePDCCH), a physical downlink control channel (PDCCH), and/or an initial CCE (control channel element) location; and
an aggregation level used for the scheduling command corresponding to the data transmitted on the air interface, such as a quantity of CCEs.

3. A masking manner used for a scheduling command corresponding to data transmitted on the air interface, such as a C-RNTI, which is used to represent a specific user equipment whose data is scheduled.

4. Information about performing HARQ retransmission by the foregoing serving node, such as information about whether retransmission is allowed or a quantity of retransmissions.

In the above scheduling information, both the masking manner used for the data transmitted on the air interface and the masking manner used for the scheduling command corresponding to the data transmitted on the air interface may be used to represent specific user equipment whose data is scheduled. Therefore, only one of the two masking manners may be needed. Alternatively, the two masking manners are integrated into one parameter, that is, a user equipment identity, which is used to represent specific user equipment whose data is scheduled.

In the above scheduling information, serving cells corresponding to target serving nodes sent by the centralized control node may be collectively referred to as a serving cell subset. Optionally, the centralized control node may be included in the serving cell subset to provide a service for user equipment. The serving cell subset is a subset of a serving cell set.

If one or more parameters in the scheduling information are fixed in a protocol, the parameters do not need to be transmitted in step 1.

If one or more parameters in the scheduling information can be notified to each serving node in the serving cell subset before step 1, these notified parameters do not need to be transmitted in step 1.

Optionally, when the serving node needs to perform HARQ retransmission, a resource used for performing the HARQ retransmission is configured.

Step 2: Each serving node in the serving cell subset that receives the data information and the scheduling information sends a scheduling command and data information to user equipment according to the data information and the scheduling information that are obtained in step 1.

For details of related parameters used for the scheduling command and content in the scheduling command, refer to descriptions of the scheduling information in step 1, and for related parameters used for sending the data information, also refer to the descriptions of the scheduling information in step 1.

It can be understood that within a specified time (an air-interface transmission time), each serving node in the serving cell subset transmits the scheduling command by using a scheduling command parameter, adds a data transmission parameter to the scheduling command, and at the same time, transmits the data information by using the data transmission parameter specified in the scheduling command.

It can be understood that the scheduling command may also be sent by using the centralized control node or at least one other neighboring cell. However, each serving node in this step sends the data information to the user equipment only according to the data information and the scheduling information that are obtained in step 1.

Step 3: The user equipment receives the scheduling command, then receives the data information according to the scheduling command, and sends feedback information to the centralized control node and/or the serving node according to a status of decoding the data information, where the feedback information is used to determine a decoding result of the user equipment.

The feedback information may be sent to each serving node, sent to the centralized control node, or sent to both each serving node and the centralized control node.

Resources used for feedback to each serving node and the centralized control node may be the same or may be different.

Step 4: Each serving node in the serving cell subset sends the feedback information of the user equipment to the centralized control node, so that the centralized control node determines whether the data information is successfully received by the user equipment.

The feedback information may be transmitted by using a message about an interface between the centralized control node and each serving node in the serving cell subset. The interface message includes but is not limited to a physical layer message, a MAC layer message, or another interface message that can transmit the feedback information.

The above step 4 is optional.

Step 5: The centralized control node determines, according to the feedback information of the user equipment and/or the feedback information forwarded by each serving node in the serving cell subset, whether the data information is successfully received by the user equipment.

If the data information is unsuccessfully received, the centralized control node may instruct an RLC (radio link control) layer to perform a quick ARQ (automatic repeat request). Alternatively, if the data information is successfully received, the centralized control node may notify an RLC layer that the data information is successfully sent.

This step is performed for a scenario in which a protocol stack function of the RLC layer and that of an upper layer are configured on the centralized control node. In this case, the centralized control node may instruct, according to a feedback status, the RLC layer to perform retransmission. If the protocol stack functions are configured on the serving node, the serving node may directly determine, according to the feedback information of the user equipment, whether retransmission needs to be performed.

The serving nodes in the serving cell subset send the data and/or the scheduling commands to the user equipment at the same time, and the user equipment may combine and decode the data and/or the scheduling commands. Therefore, reliability of transmitting the data information and/or the scheduling commands is improved, and downlink data transmission performance is enhanced. In addition, the serving nodes in the serving cell subset receive the feedback information of the user equipment at the same time. Therefore, reliability of uplink signal transmission is also improved, and performance of the quick ARQ is further ensured. For example, when the feedback information received by most serving nodes is an ACK, it may be considered that the feedback information fed back by the user equipment is an acknowledgment (ACK); otherwise, it is considered that the feedback information fed back by the user equipment is a negative acknowledgment (NACK).

In this embodiment of the present invention, similar to transmission of uplink data, an original amount of the feedback information of the user equipment may be transmitted to the centralized control node for combination and decoding, thereby increasing a combination gain.

Figure 6:
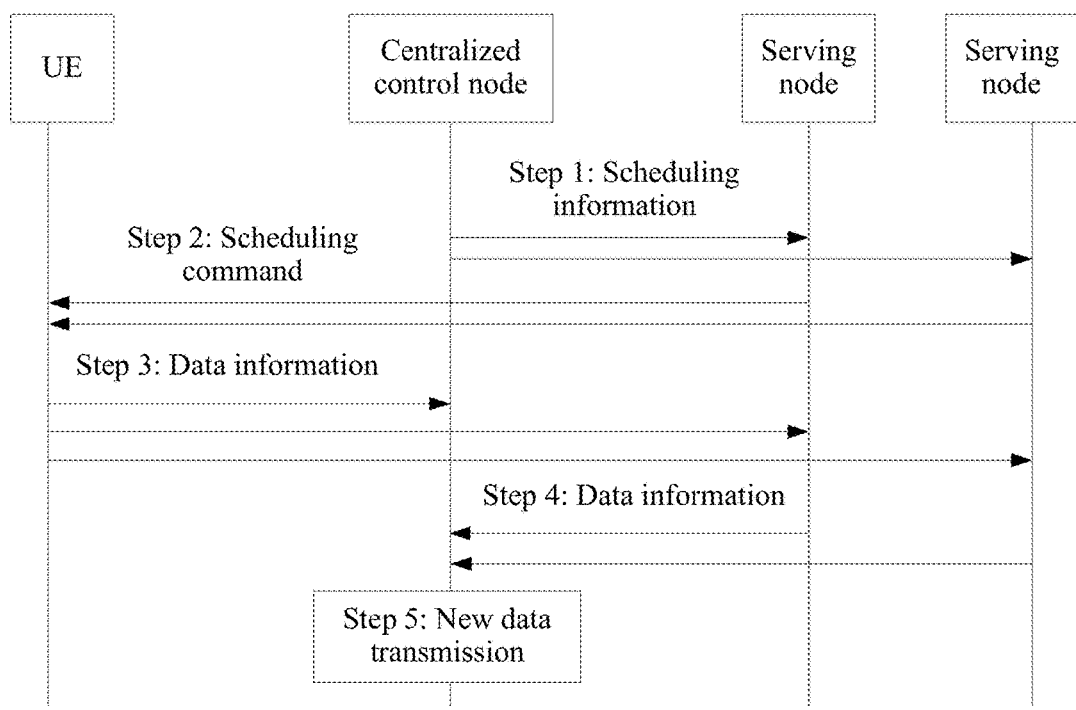
FIG. 6 is a schematic flowchart of a method according to an embodiment of the present invention.

2. As shown in FIG. 6, a procedure of a method for implementing an uplink pre-scheduling function includes the following steps.

Step 1 and step 2 are similar to steps of the downlink pre-scheduling function, and a difference lies only in that data information does not need to be sent. In addition, content of the scheduling information is an uplink grant for the user equipment (a parameter used for granting the user equipment permission to send uplink data information). The scheduling information may be delivered in a form of a scheduling command.

Step 3: After receiving the scheduling command, according to the scheduling command, the user equipment encapsulates and sends data information to each serving node in the serving cell subset.

Step 4: Each serving node in the serving cell subset receives the data information sent by the user equipment, and after successfully receiving the data information, sends the data information to the centralized control node.

Further, in this step, each serving node in the serving cell subset may feed back an ACK to the user equipment, to notify the user equipment that the data information is successfully sent.

Optionally, when each serving node in the serving cell subset fails to receive data, each serving node in the serving cell subset may notify the centralized control node, so that the centralized control node performs adaptive HARQ retransmission or triggers quick ARQ (automatic repeat request) retransmission.

Optionally, in this embodiment of the present invention, after receiving the data information, each serving node in the serving cell subset may not need to determine whether the data information is successfully received, but directly sends the received data information to the centralized control node for combination and decoding. In this way, the uplink data may obtain a combination gain, and reliability of uplink data transmission is greatly improved. Alternatively, each serving node in the serving cell subset may transfer the original data information to the centralized control node only when the node in the serving cell subset unsuccessfully obtains data after decoding the original data information; or if the original data information can be successfully decoded, sends data obtained after the original data information is decoded to the centralized control node.

Step 5: The centralized control node performs new data transmission or adaptive HARQ retransmission or triggers (quick) ARQ retransmission, according to a status of receiving uplink data information.

In this embodiment of the present invention, for downlink data information, feedback information of user equipment that is received by different serving nodes may be different, and HARQ retransmission of the different serving nodes may be affected. Therefore, a particular serving node may be specified to perform HARQ retransmission, and another serving node does not perform HARQ retransmission. For uplink data information, if a serving node performs decoding, HARQ retransmission of user equipment may be affected because decoding statuses of different serving nodes may be different. Because the user equipment does not clear a buffer after reaching a maximum quantity of sending times, a centralized control node sends a retransmission scheduling command, and then the user equipment performs HARQ retransmission according to the scheduling command. In this embodiment of the present invention, an ARQ (automatic repeat request) may be associated with an HARQ. Multiple HARQs may be equivalent to one ARQ.

Figure 7:
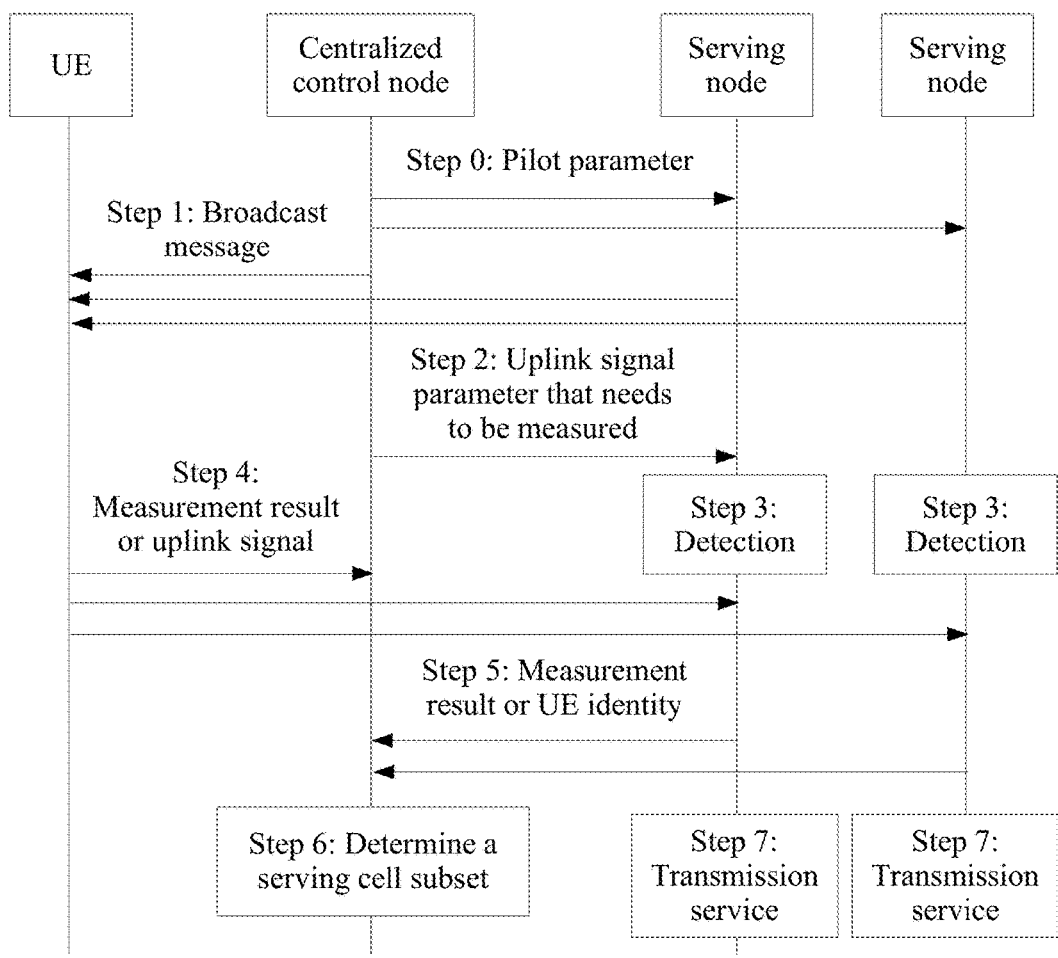
FIG. 7 is a schematic flowchart of a method according to an embodiment of the present invention.

3. As shown in FIG. 7, a serving cell subset determining method includes the following steps.

Step 1: A serving node in a serving cell set sends a system broadcast message to user equipment, to instruct the user equipment to feed back a measurement result.

In this step, a method for sending the system broadcast message may be the same as the manner of sending the scheduling information in the downlink pre-scheduling method. A difference lies in that the user equipment may not perform uplink feedback.

In this step, the system broadcast message may be sent by using a common system broadcast message, or new content may be added to a current system broadcast message. The added content is one or more of the following: a pilot parameter sent in at least one serving cell in the serving cell set, such as a pilot sequence, a time or a frequency location of a pilot, or a pilot period.

Optionally, in this embodiment of the present invention, the user equipment may be notified of the added content by using a dedicated message, and the user equipment is not notified in a system broadcast message manner. This is not limited in this embodiment of the present invention.

Before step 1, the method may further include step 0: The centralized control node may notify in advance the serving cell in the serving cell set of the pilot parameter. A specific notification method is that the pilot parameter is transmitted in a message about an interface between the centralized control node and at least one serving cell in the serving cell set. A specific message format and message name are not limited.

In addition, when there is no direct interface between the centralized control node and the serving cell in the serving cell set, the pilot parameter may be forwarded by using another serving cell. Whether to perform forwarding and a quantity of forwarding times are not limited in this embodiment of the present invention.

Step 2: A centralized control node notifies the serving node in the serving cell set of an uplink signal parameter that needs to be measured.

A specific uplink signal may include:

a signal sent on a random access channel, such as a random access code;

a sounding reference signal, such as an SRS (sounding reference signal);

a physical uplink shared channel, such as a PUSCH (physical uplink shared channel);

a physical uplink control channel, such as a PUCCH (physical uplink control channel), which may further specifically include a scheduling request and/or channel status indication reporting, and/or HARQ feedback, and the like; or may be a parameter of an uplink signal sent by other user equipment. This is not limited in this embodiment of the present invention.

The uplink signal parameter may be at least one of the following:

time information, frequency location information, power information, or the like of the uplink signal.

Optionally, in this step, the serving node in the serving cell set may be notified of a trigger condition for reporting the measurement result to the centralized control node, such as a threshold of received signal strength or a threshold of received signal quality. When the trigger condition is met, the serving node reports the measurement result to the centralized control node.

Optionally, the measurement result in this step may further include a user equipment identity corresponding to the uplink signal, such as a C-RNTI.

In addition, it should be noted that step 2 and step 1 are not performed in a sequence, and may be concurrently performed with step 0.

Step 3: The serving node in the serving cell set performs, according to step 0 and/or step 2, downlink signal sending and/or uplink signal detection.

Step 4: The user equipment measures a downlink pilot according to configuration of the broadcast message or a dedicated message, and reports a measurement result or sends an uplink signal, according to configuration of the broadcast message or the dedicated message.

Specifically, the measurement result may include a measurement result of at least one serving cell in the serving cell set.

Step 5: After receiving the measurement result reported by or the uplink signal sent by the user equipment, the serving node in the serving cell set sends, to the centralized control node according to the configuration, the measurement result reported by the user equipment; or sends, to the centralized control node according to the configuration, an uplink signal measurement result that meets a condition; or sends, to the centralized control node according to the configuration, a user equipment identity that meets a condition.

Step 6: The centralized control node determines, according to information about the measurement result reported by the serving node in the serving cell set, specific serving cell sets in which serving cells can be used as elements of a serving cell subset. A serving cell in the serving cell subset is corresponding to a serving node, and therefore the serving node may be referred to as a serving node in the serving cell subset.

Step 7: Each serving node in the serving cell subset provides a data transmission service for the user equipment. For a specific method, refer to the solution of the uplink pre-scheduling and that of the downlink pre-scheduling in the embodiments.

In this embodiment of the present invention, the user equipment can move. Therefore, a mobility management solution is needed. In a technical essence, the solution is a process of determining the serving cell subset, that is, to re-determine the serving cell subset. An update to the serving cell subset is transparent for the user equipment. Therefore, movement is smooth.

Figure 8A:
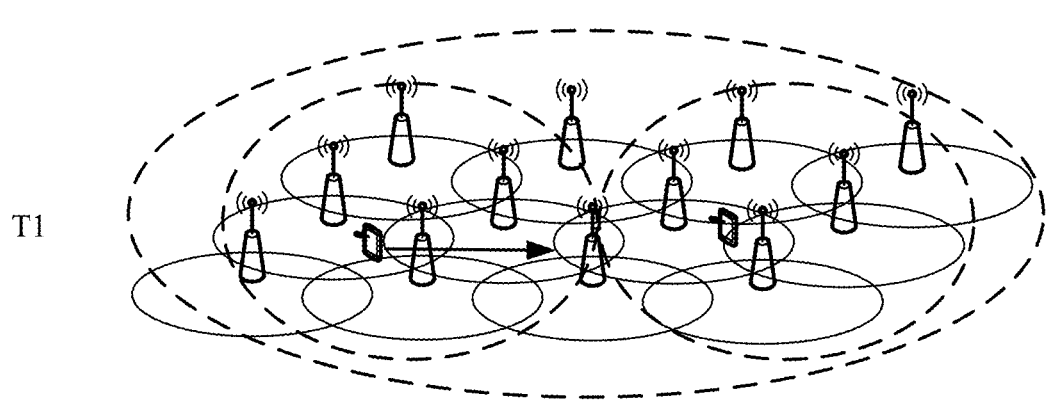
FIG. 8A is a schematic structural diagram of a serving cell set according to an embodiment of the present invention.
Figure 8B:
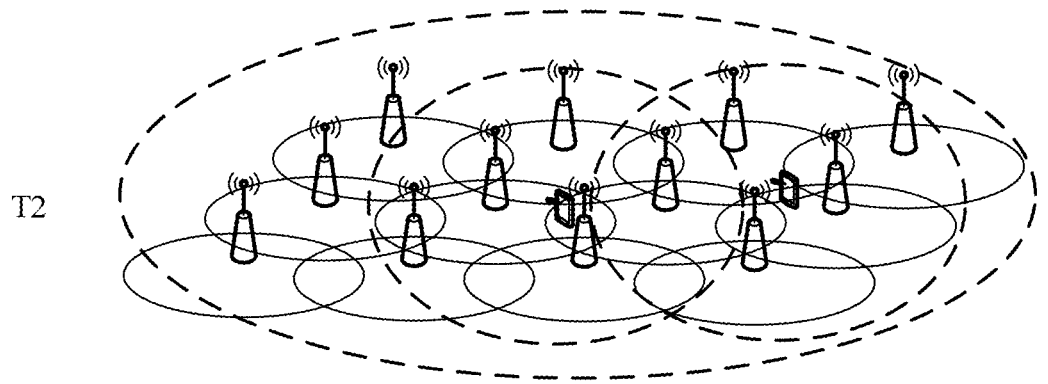
FIG. 8B is a schematic structural diagram of a serving cell set according to an embodiment of the present invention.

As shown in FIG. 8A and FIG. 8B, FIG. 8A and FIG. 8B are respectively schematic diagrams of serving cells at two moments T1 and T2. A serving cell is indicated by using an access device and a solid line circle. A set of solid line circles in a peripheral large dashed circle indicates a serving cell set. There are two user equipments in the serving cell set, and each of the two user equipments is corresponding to one small dashed circle. There is a solid line circle in each small dashed circle, and the solid line circle in the small dashed circle is a serving cell subset corresponding to the user equipment. User equipment on the left moves rightward from T1 to T2, and a serving cell subset corresponding to the user equipment is re-determined.

4. An embodiment of the present invention provides smart resource reuse between serving cell subsets and smart on/off.

In this embodiment of the present invention, if there is no overlap between serving cell subsets, full resource reuse may be implemented between two serving cell subsets when data is transmitted, as shown in FIG. 8A. In this way, a system capacity is greatly increased. When there is a partial overlap between serving cell subsets, as shown in FIG. 8B, partial resource reuse may be implemented between two serving cell subsets when data is transmitted. In this way, a system capacity is also increased to some extent.

When a serving cell does not belong to any serving cell subset, it indicates that no user equipment of the service area needs a service, and the service area may enter a "rest" state. When the serving cell is in the "rest" state, a serving node corresponding to the serving cell only needs to regularly send a downlink pilot for measurement by user equipment; or detects an uplink signal according to configuration of a centralized control node; and does not need to process data transmission. If positioning information of the user equipment is relatively accurate, the cell even does not need to do anything. The cell is activated only when the user equipment moves to a cell near the cell.

In this embodiment of the present invention, it may be determined, provided that a serving cell in a serving cell set does not belong to any serving cell subset, that no user equipment of the serving cell needs a service. In this case, the serving cell may be off to enter a "rest" state, and at the same time, detect whether user equipment enters the serving cell. The serving cell is activated when user equipment enters the serving cell. In this way, smart on/off of the serving cell is implemented. The serving cell is off to save power.

5. An embodiment of the present invention provides an enhanced solution for non-ideal backhaul between a centralized control node and a serving cell set.

To reduce a delay, this embodiment of the present invention may be implemented in backhaul in a blind scheduling manner.

Generally, when having uplink data that needs to be sent, user equipment needs to first send a scheduling request to a centralized control node. Then the centralized control node sends an uplink grant to the user equipment based on the received scheduling request. Further, the user equipment sends a buffer status report to the centralized control node. Then the centralized control node sends the uplink grant to the user equipment again based on the buffer status report. The user equipment sends the uplink data based on the uplink grant. There is a delay of approximately 10 ms in this process. This embodiment is to reduce the delay produced in this process.

Blind scheduling is as follows: When a centralized control node does not receive a scheduling request and/or a buffer status report of user equipment, the centralized control node directly sends a scheduling command to the user equipment to perform an uplink grant. In this case, if having uplink data, the user equipment may send the uplink data to a serving node according to the uplink grant. This greatly reduces an uplink data transmission delay.

Figure 9:
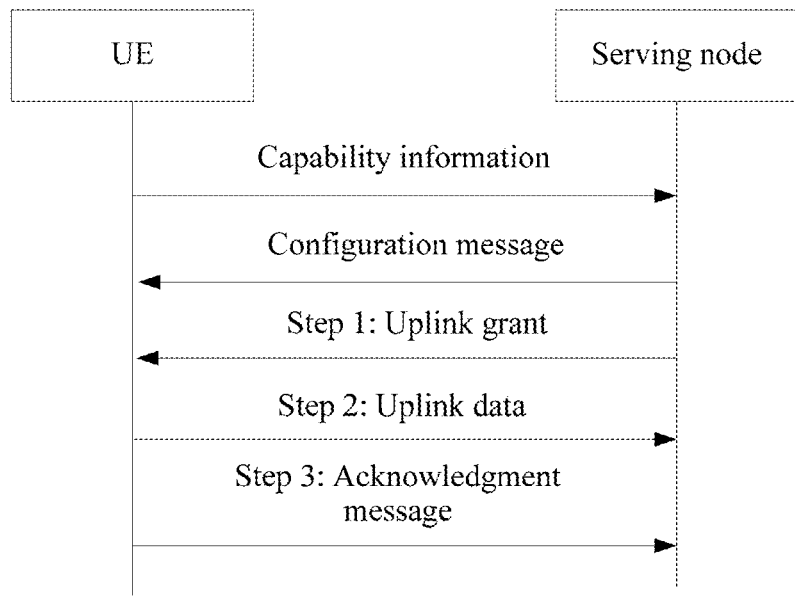
FIG. 9 is a schematic flowchart of a method according to an embodiment of the present invention.

In this embodiment of the present invention, if the user equipment has no uplink data to send, according to a current protocol, the user equipment needs to send uplink data without a valid data packet according to the uplink grant. Consequently, power is wasted and even a neighboring cell or user equipment may be interfered. In addition, for the above problem, when the user equipment is replaced with a serving node in a serving cell set, a similar problem also exists between the serving node in the serving cell set and the centralized control node. To reduce power overheads and interference, a procedure shown in FIG. 9 may be used and is as follows.

Step 1: user equipment receives an uplink grant sent by a serving node.

Step 2: The user equipment determines whether to send uplink data by using the uplink grant. If the user equipment has the uplink data that needs to be sent at this moment, the user equipment sends the uplink data by using the uplink grant; or if the user equipment has no uplink data that needs to be sent at this moment, the user equipment does not send the uplink data by using the uplink grant.

Specifically, the uplink data may be a service data packet, such as a MAC service data unit (SDU), or may be a control element, such as a PHR or a conventional buffer status report (BSR). This is not limited in this embodiment of the present invention.

Further, optionally, step 3 may be performed.

Step 3: The user equipment sends, on an uplink control channel associated with a location of a physical resource occupied by the uplink grant, an acknowledgment message of a status of receiving the uplink grant, such as an ACK.

In this step, the acknowledgment message may be sent only when the user equipment has no uplink data that needs to be sent at this moment. Therefore, after receiving the acknowledgment message, the serving node or a centralized control node may determine that the user equipment has no uplink data to send.

In this step, the uplink control channel associated with the location of the physical resource occupied by the uplink grant may be an uplink control channel location that is determined according to an initial location, an end location, or any other specified location of a CCE occupied by the uplink grant. An initial CCE location is used as an example. A location of an uplink control channel=an initial CCE location+an offset. The offset may be configured by a higher layer, such as an RRC message, or may be fixed in the protocol.

Correspondingly, after sending the uplink grant to the user equipment, the serving node attempts to receive the uplink data according to the uplink grant on the one hand; on the other hand, the serving node attempts to receive, according to the uplink grant, the acknowledgment message sent by the user equipment.

Optionally, before performing steps 1 to 3, the user equipment may first receive a configuration message sent by a centralized control device. The configuration message may carry an instruction message of whether the user equipment performs step 2 or step 3 in the steps. The configuration message may be an RRC message, a MAC layer message, or a physical layer message, and is not limited in this embodiment of the present invention.

Further, optionally, before the user equipment performs the steps, the user equipment may first report capability information of whether the user equipment can perform one or more steps in step 2 or 3. A message that reports the capability information may be an RRC message, a MAC layer message, or a physical layer message, and is not limited in this embodiment of the present invention.

6. An embodiment of the present invention further provides a method for determining a feedback resource when there are multiple CCEs.

The feedback resource is a resource, such as a PUCCH resource, for feeding back, by user equipment, a status of receiving downlink data or other feedback information.

Currently, when user equipment performs uplink HARQ feedback according to a status of receiving downlink data, a feedback resource (an uplink control channel) of the user equipment is determined by using an initial location of a physical resource CCE occupied by a scheduling command for scheduling downlink data information. Specifically, for example, a location of an uplink control channel=an initial CCE location+an offset. The offset may be configured by a higher layer, such as an RRC message, or may be fixed in a protocol. The scheduling command may occupy CCEs of different quantities, such as one CCE, two CCEs, four CCEs, or eight CCEs, to adapt to different channel environments, so as to ensure reliable transmission of the scheduling command.

Figure 10:
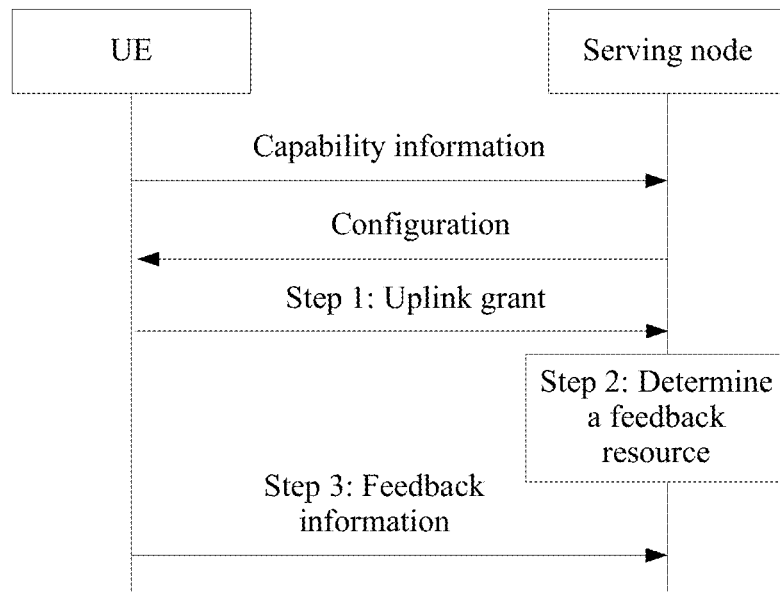
FIG. 10 is a schematic flowchart of a method according to an embodiment of the present invention.

However, when the scheduling command occupies multiple CCEs, a current feedback resource determining manner is only associated with the initial CCE location. Consequently, reliability of feedback information is affected, and thereby the feedback information is lost or wrong. Based on this, this embodiment of the present invention provides a method for enhancing feedback transmission reliability. As shown in FIG. 10, the method includes the following steps.

Step 1: user equipment receives a scheduling command.

The scheduling command may be an uplink data scheduling command (that is, downlink assignment), may be a downlink data scheduling command (that is, an uplink grant), or may be a semi-static scheduling resource release command, and is not limited in this embodiment of the present invention.

Step 2: The user equipment determines a feedback resource. If the scheduling command occupies one CCE, the user equipment determines a feedback resource according to a location of the CCE; if the scheduling command occupies multiple CCEs, the user equipment determines feedback resources according to locations of the multiple CCEs.

Specifically, a manner in which the user equipment determines the multiple feedback resources according to the locations of the multiple CCEs may be as follows:

Optionally, before step 1 and step 2, a serving node may configure a function of determining the feedback resources by the user equipment by using the locations of the multiple CCEs. A specific configuration message may be an RRC message, a MAC layer message, or a physical layer message, and is not limited in this embodiment of the present invention.

Further, optionally, when the serving node configures the function of determining the feedback resources by the user equipment by using the locations of the multiple CCEs, one or more pieces of the following information may be indicated:

1. A specific quantity, required for applying the configured function by the user equipment, of CCEs occupied by the scheduling command:

for example, when the quantity of CCEs is 4, the user equipment applies the configuration; or for example, when the quantity of CCEs is at least 2, the user equipment applies the configuration.

2. A quantity and locations of CCEs used when the user equipment applies the configured function:

for example, when the quantity of CCEs is 4, the user equipment uses the first two CCEs, the last two CCEs, or the second and the third CCEs; or for example, when the quantity of CCEs is at least 2, the user equipment uses the first two CCEs, the last two CCEs, or the second and the third CCEs . . . .

Optionally, before the steps, the user equipment may report, to the serving node, capability information that the user equipment can execute functions in one or more steps in the steps. Specifically, a message that reports the capability information may be an RRC message, a MAC layer message, or a physical layer message, and is not limited in this embodiment of the present invention.

Step 3: The user equipment sends feedback information according to the one or more determined feedback resources.

Specifically, when the user equipment sends feedback by using the multiple feedback resources, the user equipment may repeatedly send the feedback information on the multiple resources, so as to improve feedback reliability by means of repeated sending. When sending is repeated once, the reliability is improved by 3 dB. More repetitions indicate higher reliability that is improved. When the user equipment sends feedback by using the multiple feedback resources, the user equipment may uniformly encode the feedback information on the multiple resources for sending. Feedback reliability may also be effectively improved because redundancy of encoding information is increased.

In this embodiment of the present invention, when small cells are densely and successively networked, inter-base station bandwidth can be ensured. In addition, a problem that deployment is difficult may be resolved without a remote optical fiber, and interference is reduced, so that a system capacity and feedback reliability can be improved.

Figure 11:
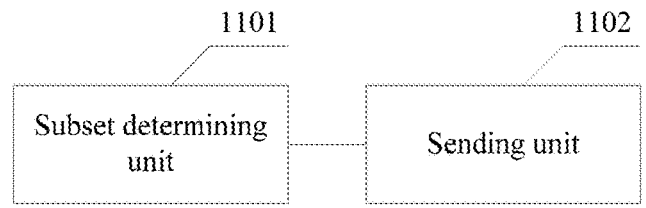
FIG. 11 is a schematic structural diagram of an access device according to an embodiment of the present invention.

An embodiment of the present invention further provides an access device, which is used as a second access device. As shown in FIG. 11, the access device includes:

a subset determining unit 1101, configured to determine a serving cell subset to which a terminal belongs, where the terminal is a destination terminal to which the second access device sends downlink data, the serving cell subset is a set of serving cells that can be accessed by the terminal, and each serving cell is corresponding to a first access device; and a sending unit 1102, configured to send downlink data and downlink scheduling information to the first access device corresponding to the serving cell in the serving cell subset determined by the subset determining unit 1101, where the downlink scheduling information is used to instruct the first access device to send the downlink data to the terminal.

In this embodiment of the present invention, the first access device may also be corresponding to a serving cell that can serve the terminal. Therefore, the "serving cell subset" may be corresponding to a set of serving cells that can serve the terminal. It can be understood that the serving cell subset should include at least one serving cell. In addition, one access device may provide many serving cells. Therefore, in this embodiment of the present invention, two or more serving cells may be corresponding to a same access device.

It can be understood that the second access device may also provide a serving cell that is accessed by the terminal, or provide a serving cell that serves the terminal. In this case, the second access device and the first access device may be physically a same access device. This is not limited in the present invention.

In this embodiment of the present invention, the downlink data and the downlink scheduling information are information that needs to be transmitted on an air interface. The downlink scheduling information is finally sent to the terminal. The downlink scheduling information is information used to instruct the first access device to send the downlink data. In the scheduling information, a parameter that is used when the first access device sends the downlink data may be specified. Because both the first access device and the second access device may be access devices corresponding to serving cells in the serving cell subset, a process in which the terminal obtains the downlink scheduling information may be as follows: The second access device and/or the first access device corresponding to the serving cell in the serving cell subset send/sends the downlink scheduling information to the terminal. After receiving the downlink scheduling information, the terminal may receive the downlink data according to the received downlink scheduling information.

In the above embodiment, access devices are classified into two types. One type is a second access device that has a centralized management function, and the other type is a first access device that provides a serving cell. When the second access device needs to send downlink data, the second access device sends the downlink data and scheduling information to a first access device corresponding to a serving cell in a serving network cell subset. Therefore, flexible wireless deployment or wired deployment of a macro cell, a small cell, and a pico cell is implemented. Each first access device sends downlink data to a terminal on a resource indicated by scheduling information, and the terminal correspondingly receives, on the resource indicated by the scheduling information, the downlink data sent by each first access device. In this way, the terminal can obtain a combination gain, reliability of transmitting the downlink data and the scheduling information is improved, and downlink data transmission performance is enhanced.

In this embodiment of the present invention, the first access device and the second access device may communicate by using an interface between the access devices, such as an X2 interface between eNodeBs. There may be no interface for direct communication between the first access device and the second access device. In this case, forwarding may be performed by using another access device, and a specific solution is as follows: The sending unit 1102 is specifically configured to: send the downlink data and the downlink scheduling information by using an interface between the first access device and the second access device; or send the downlink data and the downlink scheduling information to a third access device, and instruct the third access device to forward the downlink data and the downlink scheduling information to the first access device corresponding to the serving cell in the serving cell subset.

In this embodiment, an implementation manner in which the second access device instructs the third device to perform forwarding may be as follows: Instruction information is added to the downlink scheduling information to instruct the third device to perform forwarding; or the third access device is configured as a default forwarding device (that is, the third access device performs forwarding provided that the third access device receives the downlink data and the downlink scheduling information); or an independent message is sent to instruct the third device to perform forwarding; or an address of the first access device may be added to the downlink data and the downlink scheduling information, so that the third access device performs forwarding according to the address of the first access device. Therefore, an instruction manner may be explicit or may be implicit, and a specific instruction manner is not uniquely limited in this embodiment of the present invention.

Figure 12:
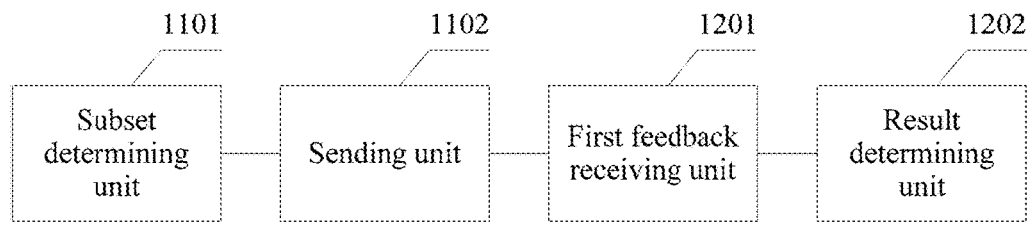
FIG. 12 is a schematic structural diagram of an access device according to an embodiment of the present invention.

In this embodiment of the present invention, because each first access device delivers scheduling information to the terminal and sends downlink data on a resource specified by the scheduling information, according to a protocol specification, each first access device receives first feedback information on the resource specified by the scheduling information. Therefore, there is also a combination gain when the first feedback information is forwarded to the second access device, and transmission performance of the first feedback information is also improved. Specifically, further, as shown in FIG. 12, the access device further includes:

a first feedback receiving unit 1201, configured to: after the downlink data and the downlink scheduling information are sent, receive first feedback information sent by the first access device corresponding to the serving cell in the serving cell subset; and a result determining unit 1202, configured to determine, according to the first feedback information received by the first feedback receiving unit 1201, whether the terminal successfully or unsuccessfully receives the downlink data.

After the first feedback information is received, how to determine whether the terminal successfully or unsuccessfully receives the downlink data may be specifically as follows: Optionally, the result determining unit 1202 is configured to: if the first feedback information received by the first feedback receiving unit 1201 indicates that first access devices of a specified quantity or a specified proportion successfully receive the downlink data, determine that the terminal successfully receives the downlink data; or if the first feedback information indicates that a quantity or a proportion of first access devices that successfully receive the downlink data is less than a specified quantity or a specified proportion, confirm that the terminal unsuccessfully receives the downlink data.

In this embodiment of the present invention, the first feedback information is information that is used to determine a status of receiving the downlink data by the terminal. The first feedback information may carry information of many types, for example, information that indicates whether a piece of downlink data is successfully received or unsuccessfully received, information that indicates specific downlink data that is successfully received and specific downlink data that is unsuccessfully received, or statistical information of successfully-receiving information, such as a proportion of downlink data that is successfully/unsuccessfully received or a quantity of downlink data that is successfully/unsuccessfully received. Therefore, the first feedback information may be of many types according to a requirement. Whether the terminal successfully or unsuccessfully receives the downlink data may be determined according to different types of feedback information in a corresponding determining manner. The above specific determining manner should not be understood as a uniqueness limitation on this embodiment of the present invention.

In this embodiment, both the specified quantity and the specified proportion may be set by persons of skills according to experience, or may be set according to a quality requirement for downlink data transmission. Theoretically, the terminal may successfully receive the downlink data provided that one piece of first feedback information displays that the terminal successfully receives the downlink data. A higher specified quantity or proportion can improve accuracy of determining that the terminal successfully receives the downlink data. In this embodiment, a specific parameter of the specified quantity and that of the specified proportion are not uniquely limited.

Figure 13:
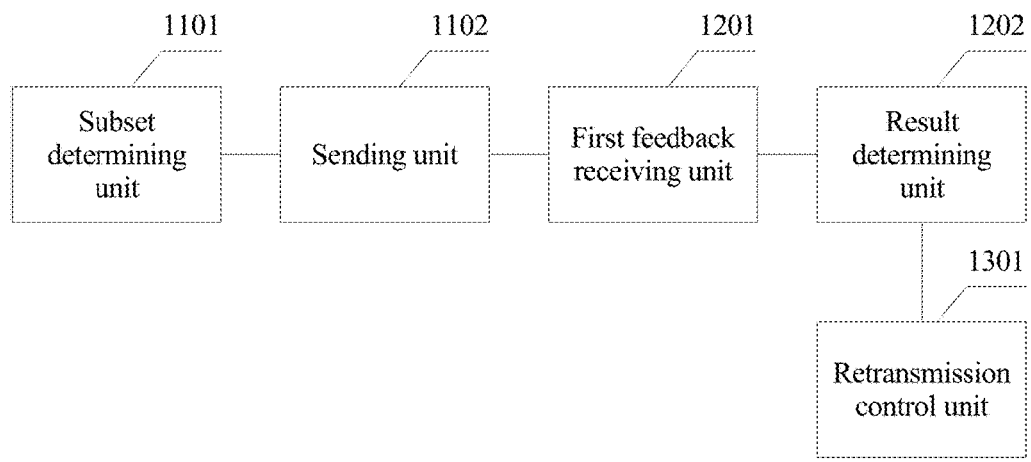
FIG. 13 is a schematic structural diagram of an access device according to an embodiment of the present invention.

In this embodiment of the present invention, if the second access device determines that the terminal unsuccessfully receives the downlink data, this embodiment of the present invention further provides an implementation solution of automatic retransmission. The solution is as follows: Further, as shown in FIG. 13, the access device further includes:

a retransmission control unit 1301, configured to: if the result determining unit 1202 determines that the terminal unsuccessfully receives the downlink data, and the second access device has a control function of a radio link control layer and that of an upper layer, instruct the radio link control layer to perform an operation of retransmitting an automatic repeat request.

In this embodiment, when the radio link control layer performs the operation of retransmitting the automatic repeat request, data that is unsuccessfully transmitted may be retransmitted. According to different protocol specifications or configurations, if the first access device has the control function of the radio link control layer and that of the upper layer, the first access device may complete automatic retransmission. Therefore, that the second access device performs automatic retransmission is not a unique optional implementation solution.

Figure 14:
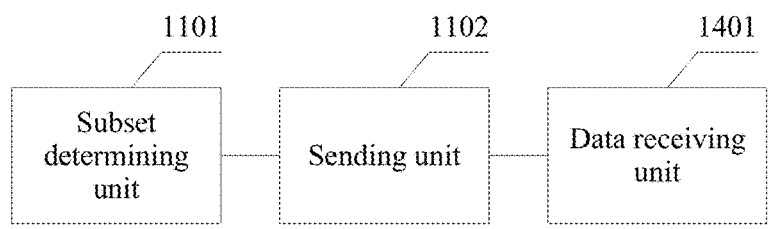
FIG. 14 is a schematic structural diagram of an access device according to an embodiment of the present invention.

The above embodiment is mainly used to schedule downlink data. This embodiment of the present invention further provides scheduling of uplink data. Specifically, further, as shown in FIG. 14, the sending unit 1102 is further configured to: after the subset determining unit 1101 determines the serving cell subset to which the terminal belongs, send uplink scheduling information to the first access device corresponding to the serving cell in the serving cell subset, where the uplink scheduling information is used to instruct to grant the terminal permission to send uplink data on a resource specified by the uplink scheduling information. The access device further includes:

a data receiving unit 1401, configured to receive uplink data forwarded by the first access device corresponding to the serving cell in the serving cell subset.

In this embodiment of the present invention, the uplink scheduling information is finally sent to the terminal, so that the terminal sends the uplink data according to the uplink scheduling information. Because both the first access device and the second access device may be access devices corresponding to serving cells in the serving cell subset, a process in which the terminal obtains the uplink scheduling information may be as follows: The second access device and/or the first access device corresponding to the serving cell in the serving cell subset send/sends the uplink scheduling information to the terminal, so that the terminal sends the uplink data according to the uplink scheduling information. After receiving the uplink scheduling information, the terminal may send the uplink data on the resource specified by the uplink scheduling information. Each first access device receives the uplink data on the resource specified by the uplink scheduling information, and although the terminal needs to send only one piece of data, each first access device forwards the data to the second access device. Therefore, the second access device may obtain a combination gain, so that reliability of transmitting the uplink data is improved, and uplink data transmission performance is enhanced.

Figure 15:
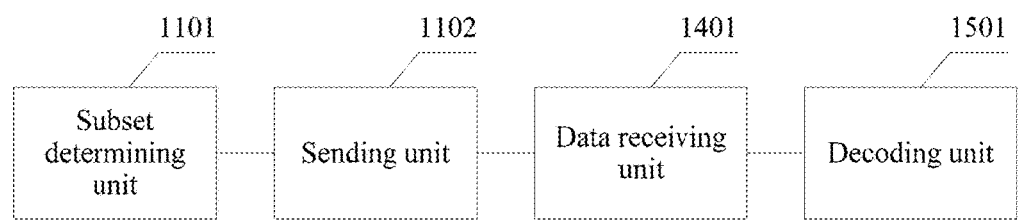
FIG. 15 is a schematic structural diagram of an access device according to an embodiment of the present invention.

In this embodiment of the present invention, the first access device may have different choices to forward the uplink data according to a capability. Specifically, further, as shown in FIG. 15, uplink data forwarded by each first access device includes: uplink data that is obtained after each first access device decodes the uplink data and that is forwarded after the first access device confirms that the uplink data is successfully received, or uplink data that is forwarded when each first receiving device does not confirm that the uplink data is successfully received. If the uplink data forwarded by each first access device is the uplink data that is forwarded when each first receiving device does not confirm that the uplink data is successfully received, the access device further includes:

a decoding unit 1501, configured to combine and decode the uplink data that is forwarded by the first access devices and received by the data receiving unit 1401.

In this embodiment, after determining that the uplink data is successfully received, the first access device may decode the uplink data and forward the decoded data. A data amount after the decoding is far less than an original data amount. Therefore, occupancy of bandwidth between the access devices may be reduced. In addition, if the first access device does not perform the steps of decoding and confirming whether the uplink data is successfully received, the first access device may directly forward the received uplink data. In this way, the second access device may obtain a combination gain when performing combination and decoding. Even if the first access device directly performs forwarding, compared with transmitting, in both an uplink direction and a downlink direction, a signal that is encoded but not decoded, 50% of bandwidth may be still reduced (bandwidth required for transmitting the original signal that is encoded but not decoded is far greater than bandwidth required for transmitting data obtained after the original signal is decoded (a data amount is equivalent to a data amount before encoding), that is, compared with transmitting original data, the bandwidth required for transmitting the data obtained after the original signal is decoded may be ignored. Therefore, if the original signal that is not decoded is transmitted only in one direction such as in the uplink direction, and a signal that is not encoded is transmitted in the other direction such as in the downlink direction, compared with transmitting, in both of the two directions, the original signal that is encoded but not decoded, bandwidth is reduced by approximately half). In addition, if a manner of forwarding the original signal and that of forwarding a decoded signal are combined when the uplink data is transmitted, that is, the first access device forwards the decoded signal if the first access device can correctly perform decoding, or forwards the original signal if the first access device cannot successfully perform decoding. In this case, an amount of data that needs to be forwarded is less than that of the original signal that is directly forwarded, so as to reduce transmission bandwidth.

In a current communications protocol, a processing procedure in which an access device provides an uplink grant for a terminal is as follows: When having uplink data that needs to be sent, the terminal needs to first send a scheduling request to a second access device and/or a first access device. Then the second access device and/or the first access device send/sends an uplink grant to the terminal based on the received scheduling request. Further, the terminal sends a buffer status report to the second access device (the buffer status report may be directly sent to the second access device, may be sent to the second access device by using the first access device, or may be sent to the second access device in a combination of the two manners). Then the second access device sends the uplink grant to the terminal again based on the status report (the uplink grant may be directly sent to the terminal, may be sent to the terminal by using the second access device, or may be sent to the terminal in a combination of the two manners). The terminal sends the uplink data based on the uplink grant. There is a delay of approximately 10 ms in this process. This embodiment of the present invention may be implemented in a blind scheduling manner to reduce the delay. Specifically, optionally, the sending unit 1102 is configured to: after the subset determining unit 1101 determines the serving cell subset to which the terminal belongs, if no scheduling request and/or no buffer report of the terminal device are/is received, send the uplink scheduling information to the first access device corresponding to the serving cell in the serving cell subset.

Blind scheduling in this embodiment of the present invention means that the second access device does not need to receive the scheduling request and/or the buffer status report of the terminal, but directly sends an uplink grant to the terminal. In this case, if having uplink data, the terminal sends the uplink data to a base station according to the uplink grant. This greatly reduces an uplink data transmission delay.

In a process of using the blind scheduling, if the terminal has no uplink data to send, according to the current protocol, the terminal needs to send uplink data without a valid data packet according to the uplink grant. Consequently, power is wasted and even a neighboring cell or terminal may be interfered. To resolve the above problem and reduce unnecessary power consumption of the terminal, this embodiment of the present invention may be as follows: Further, the sending unit 1102 is further configured to: after the subset determining unit 1101 determines the serving cell subset to which the terminal belongs, send first configuration information to the first access device corresponding to the serving cell in the serving cell subset, where the first configuration information is used to configure the first access device and/or the terminal to skip sending uplink data without a valid data packet when there is no uplink data, or to send only an uplink grant acknowledgment message when there is no uplink data, and the uplink grant acknowledgment message is used to indicate that there is no uplink data. The uplink grant acknowledgment message may be specifically a message sent on a physical uplink control channel. In addition, a specific resource used for the message may be determined according to an initial location of a physical resource CCE occupied by the uplink grant. Specifically, for example, a location of an uplink control channel=an initial CCE location+an offset. The offset may be configured by a higher layer, such as an RRC (radio resource control) message, or may be fixed in the protocol.

An implementation solution of the blind scheduling in this embodiment may be independently implemented, and does not need to depend on a network architecture, proposed in this embodiment of the present invention, that includes the first access device and the second access device.

Figure 16:
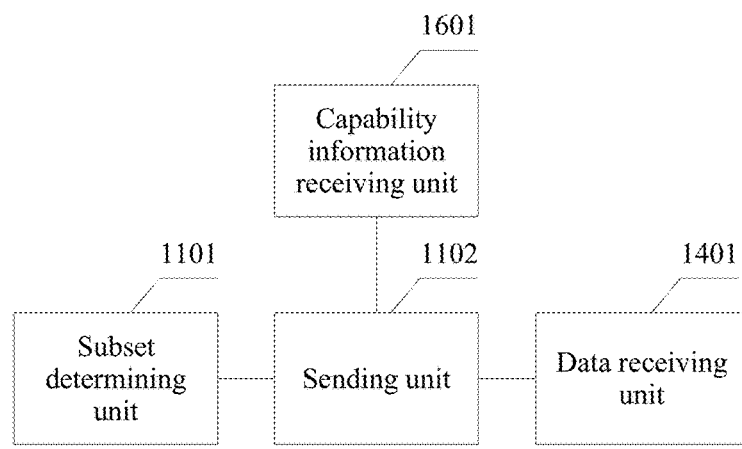
FIG. 16 is a schematic structural diagram of an access device according to an embodiment of the present invention.

In this embodiment of the present invention, the first access device may have a function of supporting information sending configuration. Therefore, to improve network compatibility, the first access device may first report a capability of the first access device, then the second access device configures a first access device that supports the configuration, and those first access devices that do not support the configuration may still forward data in their original manners. Therefore, an objective of compatibility and flexible control is achieved. Specifically, as shown in FIG. 16, the access device further includes:

a capability information receiving unit 1601, configured to receive, by the second access device before the sending unit 1102 sends the first configuration information to the first access device corresponding to the serving cell in the serving cell subset, capability information of the terminal that is forwarded by the first access device corresponding to the serving cell in the serving cell subset.

The sending unit 1102 is configured to: if confirming, according to an instruction of the capability information, that the terminal supports skipping sending the uplink data without a valid data packet when there is no uplink data, send the first configuration information to the first access device corresponding to the serving cell in the serving cell subset; or if confirming, according to an instruction of the capability information, that the terminal supports sending only the uplink grant acknowledgment message when there is no uplink data, send the first configuration information to the first access device corresponding to the serving cell in the serving cell subset.

When the terminal performs uplink HARQ (Hybrid Automatic Repeat Request, hybrid automatic retransmission) feedback according to the status of receiving the downlink data, a feedback resource (an uplink control channel) of the terminal is determined according to an initial location of a physical resource CCE occupied by scheduling information for scheduling the downlink data. Specifically, for example, a location of an uplink control channel=an initial CCE location+an offset. The offset may be configured by a higher layer, such as an RRC (radio resource control) message, or may be fixed in the protocol. The scheduling information may occupy CCEs of different quantities, such as one CCE, two CCEs, four CCEs, or eight CCEs, to adapt to different channel environments, so as to ensure reliable transmission of the scheduling command. However, when the scheduling information occupies multiple CCEs, the feedback resource is still associated with the initial CCE location, and reliability of second feedback information is affected. Consequently, the second feedback information is lost or wrong. This embodiment of the present invention provides a solution based on this. The solution is as follows: Further, the sending unit 1102 is further configured to: before sending the uplink scheduling information to the first access device corresponding to the serving cell in the serving cell subset, send second configuration information to the first access device corresponding to the serving cell in the serving cell subset, and instruct the first access device corresponding to the serving cell in the serving cell subset to forward the second configuration information to the terminal, where the second configuration information is used to instruct to determine, when the uplink scheduling information occupies at least two control channel elements CCEs, a CCE that should be used for a feedback resource and a location of the used CCE, and the feedback resource is a feedback resource that is used by the terminal to send second feedback information to the first access device and/or the second access device.

In this embodiment, an implementation manner in which the second access device instructs the first access device to perform a forwarding operation may be as follows: Instruction information is added to the second configuration information to instruct the first access device to perform the forwarding operation; or an address of the terminal is specified in a message carrying the second configuration information, so that the first access device forwards the second configuration information to the terminal; or an independent instruction message is additionally sent to instruct the first access device to perform the forwarding operation. An implementation solution in which the second access device specifically instructs the first access device to forward the second configuration information is not uniquely limited in this embodiment of the present invention.

Figure 17:
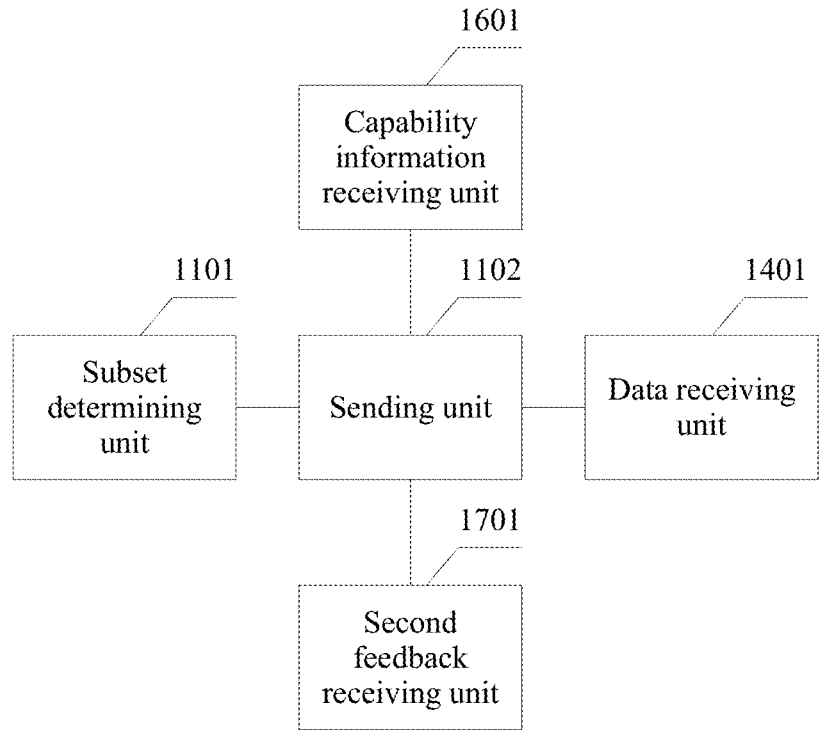
FIG. 17 is a schematic structural diagram of an access device according to an embodiment of the present invention.

Further, the terminal may add encoding redundancy information to improve feedback information reliability. Specifically, as shown in FIG. 17, the access device further includes:

a second feedback receiving unit 1701, configured to receive second feedback information that is uniformly encoded and respectively and repeatedly sent by the terminal device by using at least two feedback resources.

It can be understood that the method in which the terminal sends the uplink grant acknowledgment message, the capability reporting method, and the function configuration method are also applicable to a scenario in which the terminal has only one serving cell, a carrier aggregation scenario, a dual connectivity scenario, or the like. For example, in the scenario in which there is only one serving cell, the second access device and the first access device may be combined into one access device. Details are not described herein.

Figure 18:
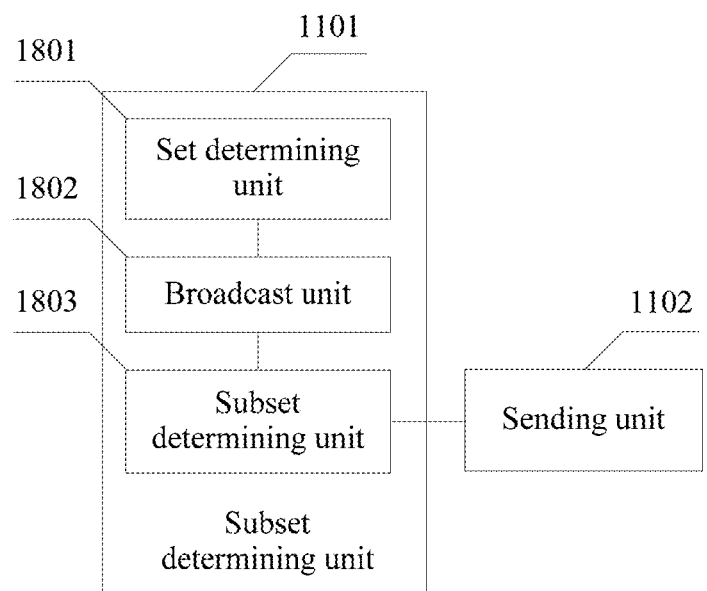
FIG. 18 is a schematic structural diagram of an access device according to an embodiment of the present invention.

This embodiment of the present invention further provides a cell subset determining manner. Specifically, optionally, as shown in FIG. 18, the subset determining unit 1101 includes:

a set determining unit 1801, configured to determine a serving cell set, where the serving cell set is a set of serving cells that are managed by the second access device;

a broadcast unit 1802, configured to broadcast a measurement instruction message to a first access device corresponding to a serving cell in the serving cell set, so that the first access device corresponding to the serving cell in the serving cell set forwards the measurement instruction message to the terminal, where the measurement instruction message is used to instruct the terminal to measure a downlink pilot, or is used to instruct any terminal to measure a downlink pilot; and a subset determining unit 1803, configured to determine, according to measurement result information forwarded by each first access device, a set of serving cells that can be accessed by the terminal as the serving cell subset to which the terminal belongs.

In this embodiment of the present invention, the second access device has a function of managing the first access device. For this point, the management function of the second access device can be learned from the solution of this embodiment of the present invention. In addition, the first access device provides a serving cell that is accessed by the terminal. Therefore, all serving cells provided by all first access devices that can be managed by the second access device should belong to the serving cells that are managed by the second access device. A set of these serving cells is the set of serving cells that are managed by the second access device.

In this embodiment of the present invention, a measurement result of the downlink pilot is used to indicate whether the terminal can access the first access device and whether access quality meets a requirement, and thereby is used to determine a serving cell that can be used as a serving cell in the serving cell subset and is in the serving cells that can be accessed by the terminal. Based on this objective, in this embodiment of the present invention, the measurement result of the downlink pilot may meet this requirement in various forms. Specifically, optionally, the measurement result information includes:

at least one of all downlink pilot measurement results, a downlink pilot measurement result that meets a configuration condition, or information about a correspondence between a terminal identity and a serving cell that can be accessed, where the measurement results are received by the first access device corresponding to the serving cell in the serving cell set.

In this embodiment of the present invention, the second access device may repeatedly perform broadcasting the measurement instruction message to the first access device. After repeated sending, a serving cell subset is determined again. In this way, the serving cell subset may be dynamically updated. Specifically, optionally, the broadcast unit 1802 is configured to repeatedly perform, according to a preset rule, broadcasting the measurement instruction message to the first access device corresponding to the serving cell in the serving cell set.

In this embodiment, the measurement instruction message is repeatedly sent and broadcast to update the serving cell subset. Therefore, there are some technical requirements for updating the serving cell subset, such as timeliness of the updating and a limitation on a system resource occupied by the updating. The used "preset rule" may be periodic, or may be event-triggered. For example, a time period for periodically broadcasting the measurement instruction message may be adjusted, or broadcasting of the measurement instruction message may be triggered in an event triggering manner. A basis of adjusting the time period may come from monitored data of the second access device. For example, if the terminal is frequently handed over between serving cells accessed by the terminal, it indicates that a timelier update is needed and that the time period needs to be shortened. Alternatively, if an updated proportion or quantity of serving cells in the serving cell subset is less than a preset threshold after the measurement instruction message is broadcast for two consecutive times, the time period may be extended. The "preset rule" used to control broadcasting of the measurement instruction message may be set according to different technical index requirements, and is not uniquely limited in this embodiment of the present invention.

Figure 19:
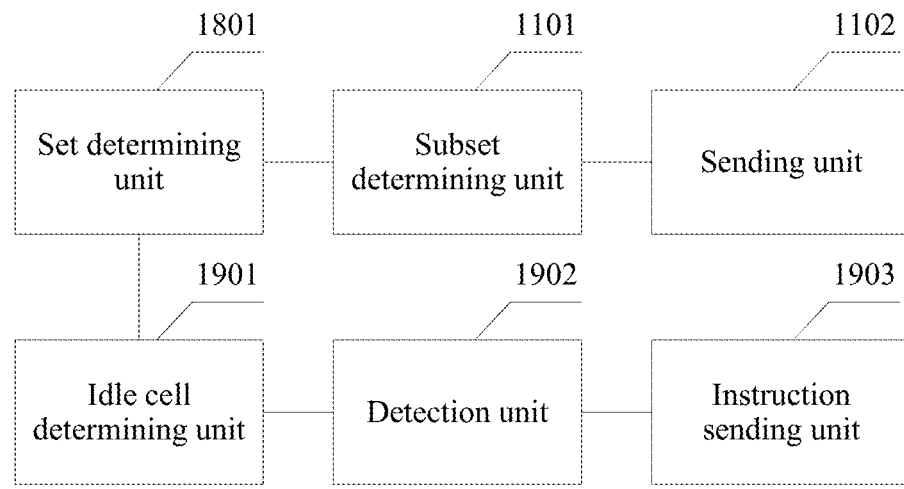
FIG. 19 is a schematic structural diagram of an access device according to an embodiment of the present invention.

In this embodiment of the present invention, sometimes, there may be no terminal that needs to access a wireless network by using the first access device. In this case, the first access device may sleep to save power. Based on this, this embodiment of the present invention provides a specific implementation solution to controlling the first access device to enter a sleep state and activating the first access device. The solution is as follows: Further, as shown in FIG. 19, the access device further includes:

a set determining unit 1801, configured to determine a serving cell set, where the serving cell set is a set of serving cells that are managed by the second access device;

an idle cell determining unit 1901, configured to determine an idle serving cell in the serving cell set determined by the set determining unit 1801, where the idle serving cell does not belong to any serving cell subset;

a detection unit 1902, configured to detect whether a terminal enters the idle serving cell determined by the idle cell determining unit 1901; and an instruction sending unit 1903, configured to: instruct a first access device corresponding to the idle serving cell to enter a sleep state; and if the detection unit 1902 detects that a terminal enters the idle serving cell, activate the first access device corresponding to the idle serving cell.

In this embodiment, because the idle serving cell does not belong to any serving cell subset, no terminal can access the idle serving cell currently. Therefore, the idle serving cell is inevitably in an idle state. In this case, an access device corresponding to the idle serving cell may enter a sleep state. "Active" and "sleep" are two operating states of the access device. The sleep state is a state in which data transmission does not need to be performed. In this state, the terminal cannot perform access. The subsequently activated first access device is opposite to the sleep state. The activated first access device has a data transmission function, and a first serving cell provided by the first access device can be accessed by the terminal. In this embodiment, a manner of activating the first access device corresponding to the idle serving cell may be as follows: Instruction information is sent to the first access device corresponding to the idle serving cell, to instruct the first access device to switch the operating state to an active state. How to specifically enable the first access device to complete switching of the operating state from the sleep state to the active state is not uniquely limited in this embodiment of the present invention.

Figure 20:
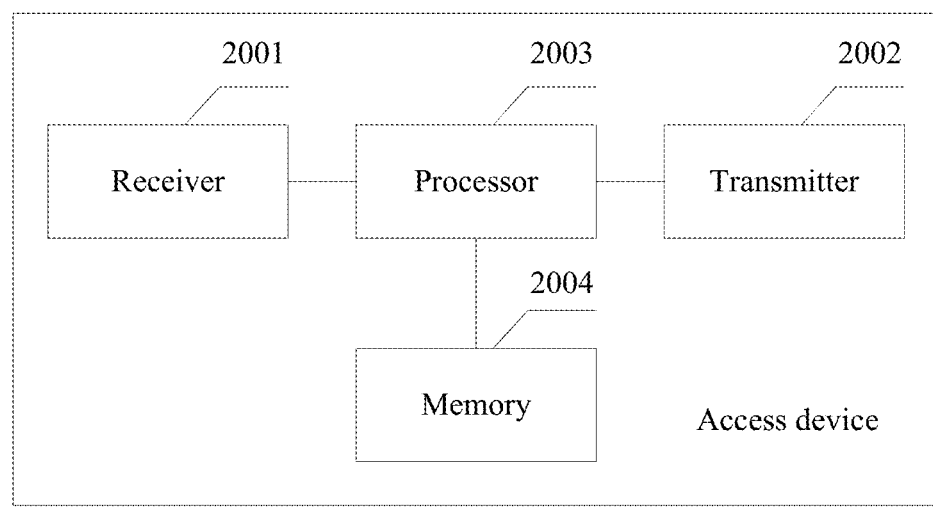
FIG. 20 is a schematic structural diagram of another access device according to an embodiment of the present invention.

An embodiment of the present invention further provides another access device. As shown in FIG. 20, the access device includes a receiver 2001, a transmitter 2002, a processor 2003, and a memory 2004. The access device is used as a second access device.

The processor 2003 is configured to determine a serving cell subset to which a terminal belongs, where the terminal is a destination terminal to which the second access device sends downlink data, the serving cell subset is a set of serving cells that can be accessed by the terminal, and each serving cell is corresponding to a first access device; and control the transmitter 2002 to send downlink data and downlink scheduling information to the first access device corresponding to the serving cell in the serving cell subset, where the downlink scheduling information is used to instruct the first access device to send the downlink data to the terminal.

In this embodiment of the present invention, the first access device may also be corresponding to a serving cell that can serve the terminal. Therefore, the "serving cell subset" may be corresponding to a set of serving cells that can serve the terminal. It can be understood that the serving cell subset should include at least one serving cell. In addition, one access device may provide many serving cells. Therefore, in this embodiment of the present invention, two or more serving cells may be corresponding to a same access device.

It can be understood that the second access device may also provide a serving cell that is accessed by the terminal, or provide a serving cell that serves the terminal. In this case, the second access device and the first access device may be physically a same access device. This is not limited in the present invention.

In this embodiment of the present invention, the downlink data and the downlink scheduling information are information that needs to be transmitted on an air interface. The downlink scheduling information is finally sent to the terminal. The downlink scheduling information is information used to instruct the first access device to send the downlink data. In the scheduling information, a parameter that is used when the first access device sends the downlink data may be specified. Because both the first access device and the second access device may be access devices corresponding to serving cells in the serving cell subset, a process in which the terminal obtains the downlink scheduling information may be as follows: The second access device and/or the first access device corresponding to the serving cell in the serving cell subset send/sends the downlink scheduling information to the terminal. After receiving the downlink scheduling information, the terminal may receive the downlink data according to the received downlink scheduling information.

In the above embodiment, access devices are classified into two types. One type is a second access device that has a centralized management function, and the other type is a first access device that provides a serving cell. When the second access device needs to send downlink data, the second access device sends the downlink data and scheduling information to a first access device corresponding to a serving cell in a serving network cell subset. Therefore, flexible wireless deployment or wired deployment of a macro cell, a small cell, and a pico cell is implemented. Each first access device sends downlink data to a terminal on a resource indicated by scheduling information, and the terminal correspondingly receives, on the resource indicated by the scheduling information, the downlink data sent by each first access device. In this way, the terminal can obtain a combination gain, reliability of transmitting the downlink data and the scheduling information is improved, and downlink data transmission performance is enhanced.

In this embodiment of the present invention, the first access device and the second access device may communicate by using an interface between the access devices, such as an X2 interface between eNodeBs. There may be no interface for direct communication between the first access device and the second access device. In this case, forwarding may be performed by using another access device, and a specific solution is as follows: Optionally, the processor 2003 is specifically configured to control the transmitter 2002 to: send the downlink data and the downlink scheduling information by using an interface between the first access device and the second access device; or send the downlink data and the downlink scheduling information to a third access device, and instruct the third access device to forward the downlink data and the downlink scheduling information to the first access device corresponding to the serving cell in the serving cell subset.

In this embodiment, an implementation manner in which the second access device instructs the third device to perform forwarding may be as follows: Instruction information is added to the downlink scheduling information to instruct the third device to perform forwarding; or the third access device is configured as a default forwarding device (that is, the third access device performs forwarding provided that the third access device receives the downlink data and the downlink scheduling information); or an independent message is sent to instruct the third device to perform forwarding; or an address of the first access device may be added to the downlink data and the downlink scheduling information, so that the third access device performs forwarding according to the address of the first access device. Therefore, an instruction manner may be explicit or may be implicit, and a specific instruction manner is not uniquely limited in this embodiment of the present invention.

In this embodiment of the present invention, because each first access device delivers scheduling information to the terminal and sends downlink data on a resource specified by the scheduling information, according to a protocol specification, each first access device receives first feedback information on the resource specified by the scheduling information. Therefore, there is also a combination gain when the first feedback information is forwarded to the second access device, and transmission performance of the first feedback information is also improved. Specifically, further, the processor 2003 is further configured to control the receiver 2001 to: after the downlink data and the downlink scheduling information are sent, receive first feedback information sent by the first access device corresponding to the serving cell in the serving cell subset; and determine, according to the first feedback information, whether the terminal successfully or unsuccessfully receives the downlink data.

After the first feedback information is received, how to determine whether the terminal successfully or unsuccessfully receives the downlink data may be specifically as follows: Optionally, the processor 2003 is specifically configured to control the receiver 2001 to: if the received first feedback information indicates that first access devices of a specified quantity or a specified proportion successfully receive the downlink data, determine that the terminal successfully receives the downlink data; or if the first feedback information indicates that a quantity or a proportion of first access devices that successfully receive the downlink data is less than a specified quantity or a specified proportion, confirm that the terminal unsuccessfully receives the downlink data.

In this embodiment of the present invention, the first feedback information is information that is used to determine a status of receiving the downlink data by the terminal. The first feedback information may carry information of many types, for example, information that indicates whether a piece of downlink data is successfully received or unsuccessfully received, information that indicates specific downlink data that is successfully received and specific downlink data that is unsuccessfully received, or statistical information of successfully-receiving information, such as a proportion of downlink data that is successfully/unsuccessfully received or a quantity of downlink data that is successfully/unsuccessfully received. Therefore, the first feedback information may be of many types according to a requirement. Whether the terminal successfully or unsuccessfully receives the downlink data may be determined according to different types of feedback information in a corresponding determining manner. The above specific determining manner should not be understood as a uniqueness limitation on this embodiment of the present invention.

In this embodiment, both the specified quantity and the specified proportion may be set by persons of skills according to experience, or may be set according to a quality requirement for downlink data transmission. Theoretically, the terminal may successfully receive the downlink data provided that one piece of first feedback information displays that the terminal successfully receives the downlink data. A higher specified quantity or proportion can improve accuracy of determining that the terminal successfully receives the downlink data. In this embodiment, a specific parameter of the specified quantity and that of the specified proportion are not uniquely limited.

In this embodiment of the present invention, if the second access device determines that the terminal unsuccessfully receives the downlink data, this embodiment of the present invention further provides an implementation solution of automatic retransmission, The solution is as follows: Further, the processor 2003 is further configured to: if it is determined that the terminal unsuccessfully receives the downlink data, and the second access device has a control function of a radio link control layer and that of an upper layer, instruct, by the second access device, the radio link control layer to perform an operation of retransmitting an automatic repeat request.

In this embodiment, when the radio link control layer performs the operation of retransmitting the automatic repeat request, data that is unsuccessfully transmitted may be retransmitted. According to different protocol specifications or configurations, if the first access device has the control function of the radio link control layer and that of the upper layer, the first access device may complete automatic retransmission. Therefore, that the second access device performs automatic retransmission is not a unique optional implementation solution.

The above embodiment is mainly used to schedule downlink data. This embodiment of the present invention further provides scheduling of uplink data. Specifically, further, the processor 2003 is further configured to control the transmitter 2002 to: after the serving cell subset to which the terminal belongs is determined, send uplink scheduling information to the first access device corresponding to the serving cell in the serving cell subset, where the uplink scheduling information is used to instruct to grant the terminal permission to send uplink data on a resource specified by the uplink scheduling information; and control the receiver 2001 to receive uplink data forwarded by the first access device corresponding to the serving cell in the serving cell subset.

In this embodiment of the present invention, the uplink scheduling information is finally sent to the terminal, so that the terminal sends the uplink data according to the uplink scheduling information. Because both the first access device and the second access device may be access devices corresponding to serving cells in the serving cell subset, a process in which the terminal obtains the uplink scheduling information may be as follows: The second access device and/or the first access device corresponding to the serving cell in the serving cell subset send/sends the uplink scheduling information to the terminal, so that the terminal sends the uplink data according to the uplink scheduling information. After receiving the uplink scheduling information, the terminal may send the uplink data on the resource specified by the uplink scheduling information. Each first access device receives the uplink data on the resource specified by the uplink scheduling information, and although the terminal needs to send only one piece of data, each first access device forwards the data to the second access device. Therefore, the second access device may obtain a combination gain, so that reliability of transmitting the uplink data is improved, and uplink data transmission performance is enhanced.

In this embodiment of the present invention, the first access device may have different choices to forward the uplink data according to a capability. Specifically, optionally, uplink data forwarded by each first access device includes:

uplink data that is obtained after each first access device decodes the uplink data and that is forwarded after the first access device confirms that the uplink data is successfully received, or uplink data that is forwarded when each first receiving device does not confirm that the uplink data is successfully received.

If the uplink data forwarded by each first access device is the uplink data that is forwarded when each first receiving device does not confirm that the uplink data is successfully received, the method further includes:

combining and decoding, by the second access device, the uplink data forwarded by the first access devices.

In this embodiment, after determining that the uplink data is successfully received, the first access device may decode the uplink data and forward the decoded data. A data amount after the decoding is far less than an original data amount. Therefore, occupancy of bandwidth between the access devices may be reduced. In addition, if the first access device does not perform the steps of decoding and confirming whether the uplink data is successfully received, the first access device may directly forward the received uplink data. In this way, the second access device may obtain a combination gain when performing combination and decoding. Even if the first access device directly performs forwarding, compared with transmitting, in both an uplink direction and a downlink direction, a signal that is encoded but not decoded, 50% of bandwidth may be still reduced (bandwidth required for transmitting the original signal that is encoded but not decoded is far greater than bandwidth required for transmitting data obtained after the original signal is decoded (a data amount is equivalent to a data amount before encoding), that is, compared with transmitting original data, the bandwidth required for transmitting the data obtained after the original signal is decoded may be ignored. Therefore, if the original signal that is not decoded is transmitted only in one direction such as in the uplink direction, and a signal that is not encoded is transmitted in the other direction such as in the downlink direction, compared with transmitting, in both of the two directions, the original signal that is encoded but not decoded, bandwidth is reduced by approximately half). In addition, if a manner of forwarding the original signal and that of forwarding a decoded signal are combined when the uplink data is transmitted, that is, the first access device forwards the decoded signal if the first access device can correctly perform decoding, or forwards the original signal if the first access device cannot successfully perform decoding. In this case, an amount of data that needs to be forwarded is less than that of the original signal that is directly forwarded, so as to reduce transmission bandwidth.

In a current communications protocol, a processing procedure in which an access device provides an uplink grant for a terminal is as follows: When having uplink data that needs to be sent, the terminal needs to first send a scheduling request to a second access device and/or a first access device. Then the second access device and/or the first access device send/sends an uplink grant to the terminal based on the received scheduling request. Further, the terminal sends a buffer status report to the second access device (the buffer status report may be directly sent to the second access device, may be sent to the second access device by using the first access device, or may be sent to the second access device in a combination of the two manners). Then the second access device sends the uplink grant to the terminal again based on the status report (the uplink grant may be directly sent to the terminal, may be sent to the terminal by using the second access device, or may be sent to the terminal in a combination of the two manners). The terminal sends the uplink data based on the uplink grant. There is a delay of approximately 10 ms in this process. This embodiment of the present invention may be implemented in a blind scheduling manner to reduce the delay. Specifically, optionally, the processor 2003 is specifically configured to control the transmitter 2002 to: after the second access device determines the serving cell subset to which the terminal belongs, if no scheduling request and/or no buffer report of the terminal device are/is received, send the uplink scheduling information to the first access device corresponding to the serving cell in the serving cell subset.

Blind scheduling in this embodiment of the present invention means that the second access device does not need to receive the scheduling request and/or the buffer status report of the terminal, but directly sends an uplink grant to the terminal. In this case, if having uplink data, the terminal sends the uplink data to a base station according to the uplink grant. This greatly reduces an uplink data transmission delay.

In a process of using the blind scheduling, if the terminal has no uplink data to send, according to the current protocol, the terminal needs to send uplink data without a valid data packet according to the uplink grant. Consequently, power is wasted and even a neighboring cell or terminal may be interfered. To resolve the above problem and reduce unnecessary power consumption of the terminal, this embodiment of the present invention may be as follows: Further, the processor 2003 is further configured to control the transmitter 2002 to: after the serving cell subset to which the terminal belongs is determined, send first configuration information to the first access device corresponding to the serving cell in the serving cell subset, where the first configuration information is used to configure the first access device and/or the terminal to skip sending uplink data without a valid data packet when there is no uplink data, or to send only an uplink grant acknowledgment message when there is no uplink data, and the uplink grant acknowledgment message is used to indicate that there is no uplink data. The uplink grant acknowledgment message may be specifically a message sent on a physical uplink control channel. In addition, a specific resource used for the message may be determined according to an initial location of a physical resource CCE occupied by the uplink grant. Specifically, for example, a location of an uplink control channel=an initial CCE location+an offset. The offset may be configured by a higher layer, such as an RRC (radio resource control) message, or may be fixed in the protocol.

An implementation solution of the blind scheduling in this embodiment may be independently implemented, and does not need to depend on a network architecture, proposed in this embodiment of the present invention, that includes the first access device and the second access device.

In this embodiment of the present invention, the first access device may have a function of supporting information sending configuration. Therefore, to improve network compatibility, the first access device may first report a capability of the first access device, then the second access device configures a first access device that supports the configuration, and those first access devices that do not support the configuration may still forward data in their original manners. Therefore, an objective of compatibility and flexible control is achieved. Specifically, further, the processor 2003 is further configured to control the receiver 2001 to: before the second access device sends the first configuration information to the first access device corresponding to the serving cell in the serving cell subset, receive capability information of the terminal that is forwarded by the first access device corresponding to the serving cell in the serving cell subset; and control the transmitter 2002 to:

if confirming, according to an instruction of the capability information, that the terminal supports skipping sending the uplink data without a valid data packet when there is no uplink data, send the first configuration information to the first access device corresponding to the serving cell in the serving cell subset; or if the second access device confirms, according to an instruction of the capability information, that the terminal supports sending only the uplink grant acknowledgment message when there is no uplink data, send the first configuration information to the first access device corresponding to the serving cell in the serving cell subset.

When the terminal performs uplink HARQ (Hybrid Automatic Repeat Request, hybrid automatic retransmission) feedback according to the status of receiving the downlink data, a feedback resource (an uplink control channel) of the terminal is determined according to an initial location of a physical resource CCE occupied by scheduling information for scheduling the downlink data. Specifically, for example, a location of an uplink control channel=an initial CCE location+an offset. The offset may be configured by a higher layer, such as an RRC (radio resource control) message, or may be fixed in the protocol. The scheduling information may occupy CCEs of different quantities, such as one CCE, two CCEs, four CCEs, or eight CCEs, to adapt to different channel environments, so as to ensure reliable transmission of the scheduling command. However, when the scheduling information occupies multiple CCEs, the feedback resource is still associated with the initial CCE location, and reliability of second feedback information is affected. Consequently, the second feedback information is lost or wrong. This embodiment of the present invention provides a solution based on this. The solution is as follows: Further, the processor 2003 is further configured to control the transmitter 2002 to: before sending the uplink scheduling information to the first access device corresponding to the serving cell in the serving cell subset, send second configuration information to the first access device corresponding to the serving cell in the serving cell subset, and instruct the first access device corresponding to the serving cell in the serving cell subset to forward the second configuration information to the terminal, where the second configuration information is used to instruct to determine, when the uplink scheduling information occupies at least two control channel elements CCEs, a CCE that should be used for a feedback resource and a location of the used CCE, and the feedback resource is a feedback resource that is used by the terminal to send second feedback information to the first access device and/or the second access device.

In this embodiment, an implementation manner in which the second access device instructs the first access device to perform a forwarding operation may be as follows: Instruction information is added to the second configuration information to instruct the first access device to perform the forwarding operation; or an address of the terminal is specified in a message carrying the second configuration information, so that the first access device forwards the second configuration information to the terminal; or an independent instruction message is additionally sent to instruct the first access device to perform the forwarding operation. An implementation solution in which the second access device specifically instructs the first access device to forward the second configuration information is not uniquely limited in this embodiment of the present invention.

Further, the terminal may add encoding redundancy information to improve feedback information reliability. Specifically, further, the processor 2003 is further configured to control the receiver 2001 to: receive second feedback information that is uniformly encoded and respectively and repeatedly sent by the terminal device by using at least two feedback resources.

It can be understood that the method in which the terminal sends the uplink grant acknowledgment message, the capability reporting method, and the function configuration method are also applicable to a scenario in which the terminal has only one serving cell, a carrier aggregation scenario, a dual connectivity scenario, or the like. For example, in the scenario in which there is only one serving cell, the second access device and the first access device may be combined into one access device. Details are not described herein.

This embodiment of the present invention further provides a cell subset determining manner. Specifically, optionally, the processor 2003 is specifically configured to determine, by the second access device, a serving cell set, where the serving cell set is a set of serving cells that are managed by the second access device;

broadcast a measurement instruction message to a first access device corresponding to a serving cell in the serving cell set, so that the first access device corresponding to the serving cell in the serving cell set forwards the measurement instruction message to the terminal, where the measurement instruction message is used to instruct the terminal to measure a downlink pilot, or is used to instruct any terminal to measure a downlink pilot; and determine, according to measurement result information forwarded by each first access device, a set of serving cells that can be accessed by the terminal as the serving cell subset to which the terminal belongs.

In this embodiment of the present invention, the second access device has a function of managing the first access device. For this point, the management function of the second access device can be learned from the solution of this embodiment of the present invention. In addition, the first access device provides a serving cell that is accessed by the terminal. Therefore, all serving cells provided by all first access devices that can be managed by the second access device should belong to the serving cells that are managed by the second access device. A set of these serving cells is the set of serving cells that are managed by the second access device.

In this embodiment of the present invention, a measurement result of the downlink pilot is used to indicate whether the terminal can access the first access device and whether access quality meets a requirement, and thereby is used to determine a serving cell that can be used as a serving cell in the serving cell subset and is in the serving cells that can be accessed by the terminal. Based on this objective, in this embodiment of the present invention, the measurement result of the downlink pilot may meet this requirement in various forms. Specifically, optionally, the measurement result information includes:

at least one of all downlink pilot measurement results, a downlink pilot measurement result that meets a configuration condition, or information about a correspondence between a terminal identity and a serving cell that can be accessed, where the measurement results are received by the first access device corresponding to the serving cell in the serving cell set.

In this embodiment of the present invention, the second access device may repeatedly perform broadcasting the measurement instruction message to the first access device. After repeated sending, a serving cell subset is determined again. In this way, the serving cell subset may be dynamically updated. Specifically, optionally, the processor 2003 is specifically configured to repeatedly perform, by the second access device according to a preset rule, broadcasting the measurement instruction message to the first access device corresponding to the serving cell in the serving cell set.

In this embodiment, the measurement instruction message is repeatedly sent and broadcast to update the serving cell subset. Therefore, there are some technical requirements for updating the serving cell subset, such as timeliness of the updating and a limitation on a system resource occupied by the updating. The used "preset rule" may be periodic, or may be event-triggered. For example, a time period for periodically broadcasting the measurement instruction message may be adjusted, or broadcasting of the measurement instruction message may be triggered in an event triggering manner. A basis of adjusting the time period may come from monitored data of the second access device. For example, if the terminal is frequently handed over between serving cells accessed by the terminal, it indicates that a timelier update is needed and that the time period needs to be shortened. Alternatively, if an updated proportion or quantity of serving cells in the serving cell subset is less than a preset threshold after the measurement instruction message is broadcast for two consecutive times, the time period may be extended. The "preset rule" used to control broadcasting of the measurement instruction message may be set according to different technical index requirements, and is not uniquely limited in this embodiment of the present invention.

In this embodiment of the present invention, sometimes, there may be no terminal that needs to access a wireless network by using the first access device. In this case, the first access device may sleep to save power. Based on this, this embodiment of the present invention provides a specific implementation solution to controlling the first access device to enter a sleep state and activating the first access device. The solution is as follows: Further, the processor 2003 is further configured to determine a serving cell set, where the serving cell set is a set of serving cells that are managed by the second access device;

determine an idle serving cell in the serving cell set, where the idle serving cell does not belong to any serving cell subset;

instruct a first access device corresponding to the idle serving cell to enter a sleep state; and if it is detected that a terminal enters the idle serving cell, activate the first access device corresponding to the idle serving cell.

In this embodiment, because the idle serving cell does not belong to any serving cell subset, no terminal can access the idle serving cell currently. Therefore, the idle serving cell is inevitably in an idle state. In this case, an access device corresponding to the idle serving cell may enter a sleep state. "Active" and "sleep" are two operating states of the access device. The sleep state is a state in which data transmission does not need to be performed. In this state, the terminal cannot perform access. The subsequently activated first access device is opposite to the sleep state. The activated first access device has a data transmission function, and a first serving cell provided by the first access device can be accessed by the terminal. In this embodiment, a manner of activating the first access device corresponding to the idle serving cell may be as follows: Instruction information is sent to the first access device corresponding to the idle serving cell, to instruct the first access device to switch the operating state to an active state. How to specifically enable the first access device to complete switching of the operating state from the sleep state to the active state is not uniquely limited in this embodiment of the present invention.

Figure 21:
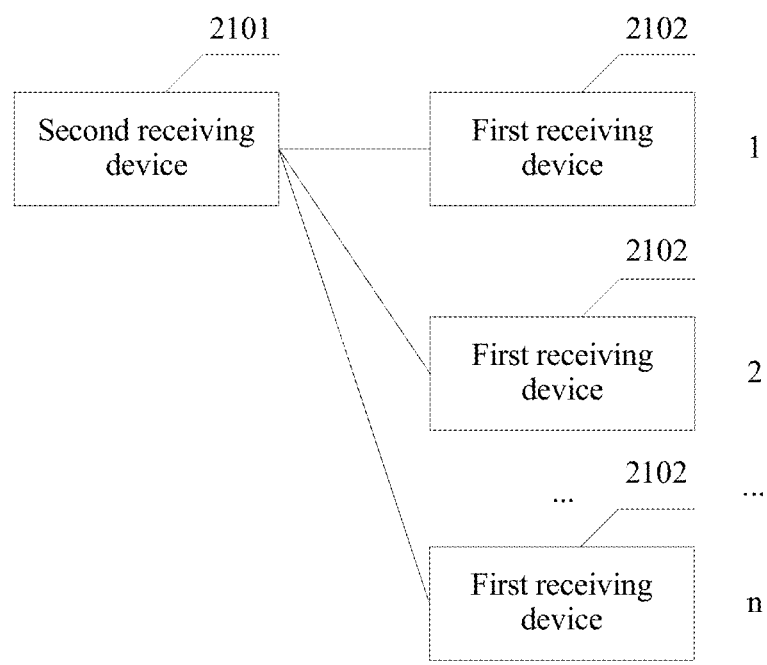
FIG. 21 is a schematic structural diagram of a wireless network according to an embodiment of the present invention.

An embodiment of the present invention further provides a wireless network, which includes at least two access devices, as shown in FIG. 21.

The at least two access devices include at least one access device that is used as a second access device 2101 and at least one access device that is used as a first access device 2102, according to this embodiment of the present invention.

As a typical application scenario, FIG. 21 includes one second access device and n first access devices. A quantity of access devices is related to a serving cell subset, and the serving cell subset is related to a serving cell that can be accessed by a terminal. The serving cell that can be accessed by the terminal changes as the terminal changes, and also changes with location movement of the terminal, an operating status of the access device/the terminal, and competition between terminals. Therefore, the second access device and the first access device change in a process in which the wireless network provides a service. A quantity of first access devices is not necessarily fixed. A quantity of access devices shown in FIG. 21 is merely used as an example, and should not be understood as a limitation on this embodiment of the present invention.

In the above embodiment, access devices are classified into two types. One type is a second access device that has a centralized management function, and the other type is a first access device that provides a serving cell. When the second access device needs to send downlink data, the second access device sends the downlink data and scheduling information to a first access device corresponding to a serving cell in a serving network cell subset. Therefore, flexible wireless deployment or wired deployment of a macro cell, a small cell, and a pico cell is implemented. Each first access device sends downlink data to a terminal on a resource indicated by scheduling information, and the terminal correspondingly receives, on the resource indicated by the scheduling information, the downlink data sent by each first access device. In this way, the terminal can obtain a combination gain, reliability of transmitting the downlink data and the scheduling information is improved, and downlink data transmission performance is enhanced.

It should be noted that, the apparatus division is merely logical function division, but is not limited to the foregoing division, as long as corresponding functions can be implemented. In addition, specific names of the functional units are merely provided for the purpose of distinguishing the units from one another, but are not intended to limit the protection scope of the present invention.

In addition, persons of ordinary skill in the art may understand that all or some of the steps in the method embodiments may be implemented by a program instructing relevant hardware. The program may be stored in a computer readable storage medium. The storage medium may include: a read-only memory, a magnetic disk, or an optical disc.

The foregoing descriptions are merely examples of specific implementation manners of the present invention, but are not intended to limit the protection scope of the present invention. Any variation or replacement readily figured out by persons skilled in the art within the technical scope disclosed in the embodiments of the present invention shall fall within the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:

1. A wireless network scheduling method, comprising:
   determining, by a second access device, a serving cell subset to which a terminal belongs, wherein the terminal is a destination terminal to which the second access device sends downlink data, the serving cell subset is a set of serving cells that can be accessed by the terminal, and each serving cell corresponds to a respective first access device;
   sending, by the second access device, downlink data and downlink scheduling information to a first access device corresponding to a serving cell in the serving cell subset, wherein the downlink scheduling information is for instructing the first access device to send the downlink data to the terminal;
   sending, by the second access device, uplink scheduling information to the first access device, wherein the uplink scheduling information is for granting the terminal permission to send uplink data on a resource specified by the uplink scheduling information;
   receiving, by the second access device, uplink data forwarded by the first access device;
   sending, by the second access device, first configuration information to the first access device, wherein the first configuration information is for configuring the first access device and/or the terminal to send an uplink grant acknowledgment message when there is no uplink data, the uplink grant acknowledgment message indicating that there is no uplink data.

2. The method according to claim 1, wherein sending the downlink data and the downlink scheduling information comprises:
   sending the downlink data and the downlink scheduling information by using an interface between the first access device and the second access device; or
   sending the downlink data and the downlink scheduling information to a third access device, and instructing the third access device to forward the downlink data and the downlink scheduling information to the first access device.

3. The method according to claim 1, wherein after sending the downlink data and the downlink scheduling information, the method further comprises:
   receiving, by the second access device, first feedback information sent by the first access device; and
   determining, according to the first feedback information, whether the terminal successfully or unsuccessfully receives the downlink data.

4. The method according to claim 3, wherein determining whether the terminal successfully or unsuccessfully receives the downlink data comprises:
   if the received first feedback information indicates that first access devices of a specified quantity or a specified proportion successfully receive the downlink data, determining that the terminal successfully receives the downlink data; or
   if the first feedback information indicates that a quantity or a proportion of first access devices that successfully receive the downlink data is less than a specified quantity or a specified proportion, confirming that the terminal unsuccessfully receives the downlink data.

5. The method according to claim 3, wherein if it is determined that the terminal unsuccessfully receives the downlink data, the method further comprises:

if the second access device has a control function of a radio link control layer and that of an upper layer, instructing, by the second access device, the radio link control layer to perform an operation of retransmitting an automatic repeat request.

6. The method according to claim 1, wherein uplink data forwarded by each respective first access device is obtained after each respective first access device decodes the uplink data and is forwarded after the first access device confirms that the uplink data is successfully received.

7. The method according to claim 1, wherein sending the uplink scheduling information to the first access device is performed after determining the serving cell subset to which the terminal belongs, and no scheduling request and/or no buffer report of the terminal are/is received.

8. The method according to claim 1, wherein before sending the first configuration information to the first access device, the method further comprises:
 receiving, by the second access device, capability information of the terminal that is forwarded by the first access device; and
 determining, by the second access device according to the capability information, that the terminal supports sending the uplink grant acknowledgment message when there is no uplink data.

9. A second access device, comprising:
 a processor, configured to determine a serving cell subset to which a terminal belongs, wherein the terminal is a destination terminal to which the second access device sends downlink data, the serving cell subset is a set of serving cells that can be accessed by the terminal, and each serving cell corresponds to a respective first access device; and
 a transmitter, configured to send downlink data and downlink scheduling information to a first access device corresponding to a serving cell in the serving cell subset determined by the processor, wherein the downlink scheduling information is for instructing the first access device to send the downlink data to the terminal;
 wherein the transmitter is further configured to: send uplink scheduling information to the first access device, wherein the uplink scheduling information is for granting the terminal permission to send uplink data on a resource specified by the uplink scheduling information;
 wherein the second access device further comprises: a receiver configured to receive uplink data forwarded by the first access device; and
 wherein the transmitter is further configured to: send first configuration information to the first access device, wherein the first configuration information is for configuring the first access device and/or the terminal to send an uplink grant acknowledgment message when there is no uplink data, the uplink grant acknowledgment message indicating that there is no uplink data.

10. The second access device according to claim 9, wherein sending the downlink data and the downlink scheduling information comprises:
 sending the downlink data and the downlink scheduling information by using an interface between the first access device and the second access device; or
 sending the downlink data and the downlink scheduling information to a third access device, and instructing the third access device to forward the downlink data and the downlink scheduling information to the first access device.

11. The second access device according to claim 9, wherein the access device further comprises:
 a receiver, configured to: after the downlink data and the downlink scheduling information are sent, receive first feedback information sent by the first access device; and
 wherein the processor is further configured to determine, according to the first feedback information received by the receiver, whether the terminal successfully or unsuccessfully receives the downlink data.

12. The second access device according to claim 11, wherein the processor is configured to:
 if the first feedback information received by the receiver indicates that first access devices of a specified quantity or a specified proportion successfully receive the downlink data, determine that the terminal successfully receives the downlink data; or
 if the first feedback information indicates that a quantity or a proportion of first access devices that successfully receive the downlink data is less than a specified quantity or a specified proportion, confirm that the terminal unsuccessfully receives the downlink data.

13. The second access device according to claim 11, wherein the processor is further configured to: if the processor determines that the terminal unsuccessfully receives the downlink data, and the second access device has a control function of a radio link control layer and that of an upper layer, instruct the radio link control layer to perform an operation of retransmitting an automatic repeat request.

14. The second access device according to claim 9, wherein uplink data forwarded by each respective first access device is obtained after each respective first access device decodes the uplink data and is forwarded after the respective first access device confirms that the uplink data is successfully received.

15. The second access device according to claim 9, wherein the transmitter is configured to send the uplink scheduling information to the first access device after the processor determines the serving cell subset to which the terminal belongs and no scheduling request and/or no buffer report of the terminal are/is received.

16. The second access device according to claim 9, wherein
 the receiver is further configured to receive capability information of the terminal that is forwarded by the first access device; and
 wherein the processor is further configured to determine, according to the capability information, that the terminal supports sending the uplink grant acknowledgment message when there is no uplink data.

17. The method according to claim 1, wherein uplink data forwarded by each respective first access device is forwarded when each respective first access device does not confirm that the uplink data is successfully received; and
 wherein the method further comprises: combining and decoding, by the second access device, the uplink data forwarded by the respective first access devices.

18. The second access device according to claim 9, wherein uplink data forwarded by each respective first access device is uplink data that is forwarded when respective first access device does not confirm that the uplink data is successfully received; and
 wherein the processor is further configured to combine and decode the uplink data that is forwarded by the respective first access devices.

* * * * *